(12) United States Patent
Li et al.

(10) Patent No.: US 12,529,854 B2
(45) Date of Patent: Jan. 20, 2026

(54) KEEP-OUT ZONE (KOZ) BARRIERS TO PREVENT EPOXY FLOW INTO V-GROOVE ZONE ON PHOTONICS DIE

(71) Applicant: Intel Corporation, Santa Clara, CA (US)

(72) Inventors: Xiaoqian Li, Chandler, AZ (US); Jingyi Huang, Chandler, AZ (US); Santosh Shaw, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 905 days.

(21) Appl. No.: 17/538,665

(22) Filed: Nov. 30, 2021

(65) Prior Publication Data

US 2023/0168448 A1 Jun. 1, 2023

(51) Int. Cl.
*G02B 6/42* (2006.01)

(52) U.S. Cl.
CPC .......... *G02B 6/4243* (2013.01); *G02B 6/423* (2013.01); *G02B 6/4239* (2013.01); *G02B 6/4249* (2013.01); *G02B 6/4269* (2013.01); *G02B 6/4274* (2013.01); *G02B 6/428* (2013.01)

(58) Field of Classification Search
CPC ........ G02B 6/12004; G02B 6/12; G02B 6/30; G02B 6/4243; G02B 6/12002; G02B 2006/12061; G02B 6/423; G02B 6/4239; G02B 6/4249; G02B 6/4269; G02B 6/4274; G02B 6/428; H01L 21/563
See application file for complete search history.

(56) References Cited

U.S. PATENT DOCUMENTS

| | | | |
|---|---|---|---|
| 2018/0314017 A1* | 11/2018 | Nuttall | G02B 6/4274 |
| 2019/0310431 A1* | 10/2019 | Patel | G02B 6/3897 |
| 2020/0310052 A1* | 10/2020 | Lim | H01L 21/56 |
| 2023/0069212 A1* | 3/2023 | Huang | G02B 6/12004 |

* cited by examiner

*Primary Examiner* — Michelle R Connelly
(74) *Attorney, Agent, or Firm* — Alliance IP, LLC

(57) ABSTRACT

In one embodiment, photonics die includes one or more opto-electronic elements to receive optical signals and generate electrical signals based on the optical signals and a plurality of v-grooves in a surface of the photonics die and at an edge of the die. Each v-groove is to interface with a fiber optic cable and align the fiber optic cable with an optical interconnect to optically couple the fiber optic cable with the opto-electronic elements. The photonics die also includes a plurality of bonding pads on the surface of the photonics die and electrically connected to the one or more opto-electronic elements, and a plurality of metal bumps coupled to respective bonding pads. The photonics die further includes a barrier formation between the metal bumps and the plurality of v-grooves, e.g., to prevent the overflow of underfill into the v-groove region of the photonics die.

25 Claims, 12 Drawing Sheets

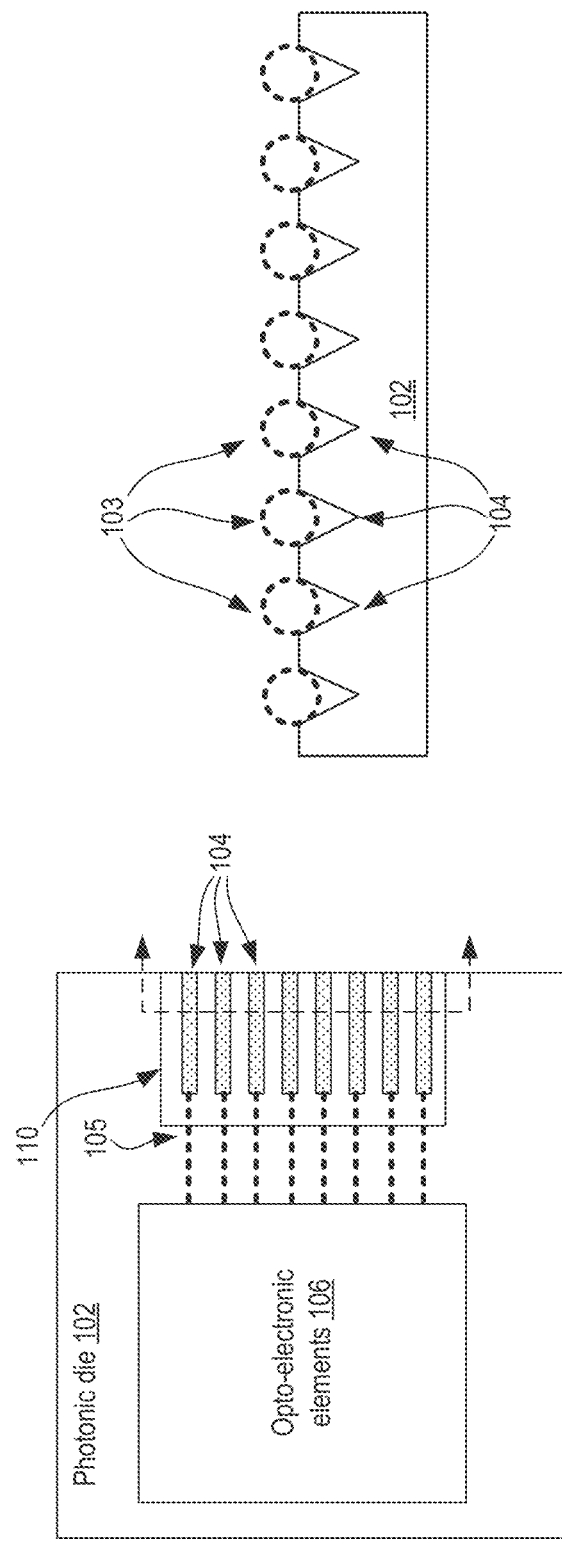

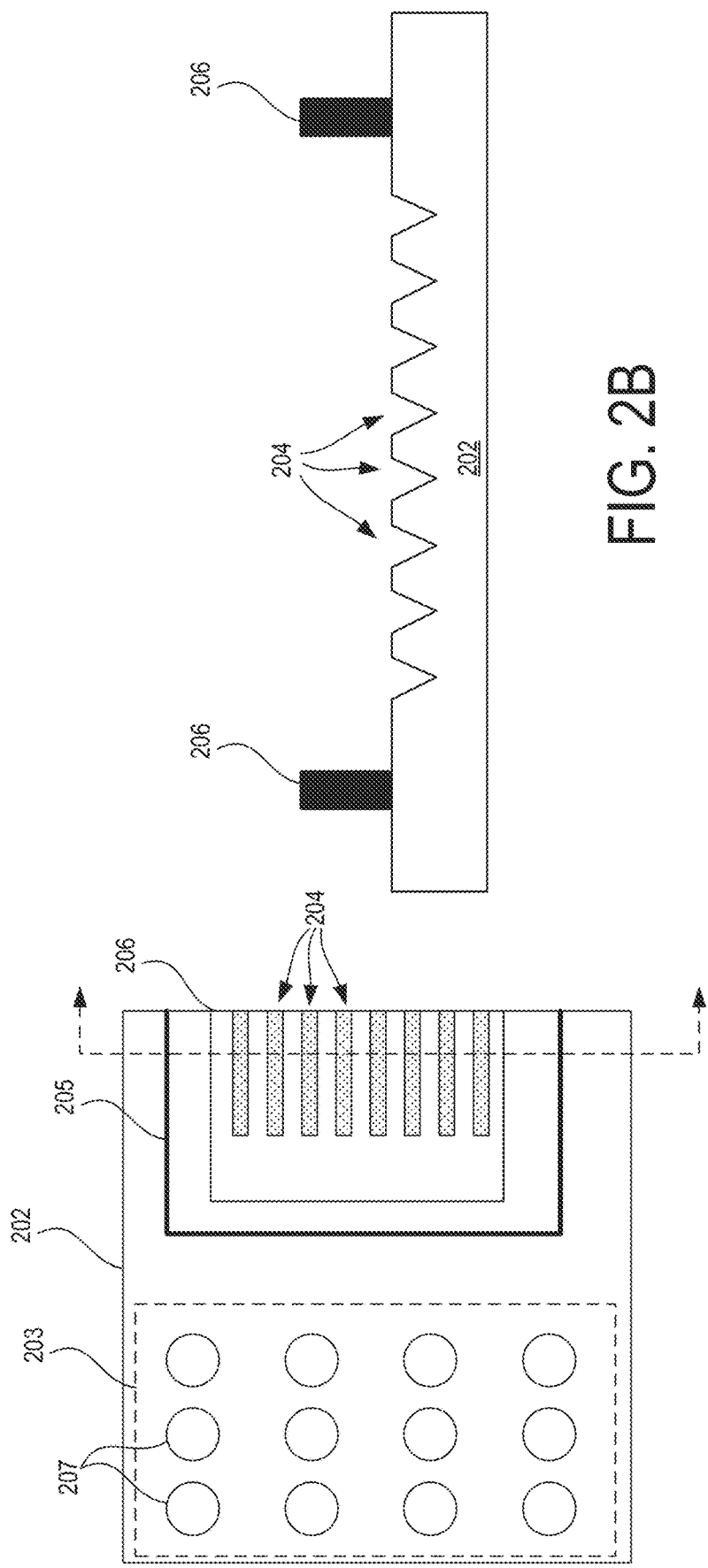

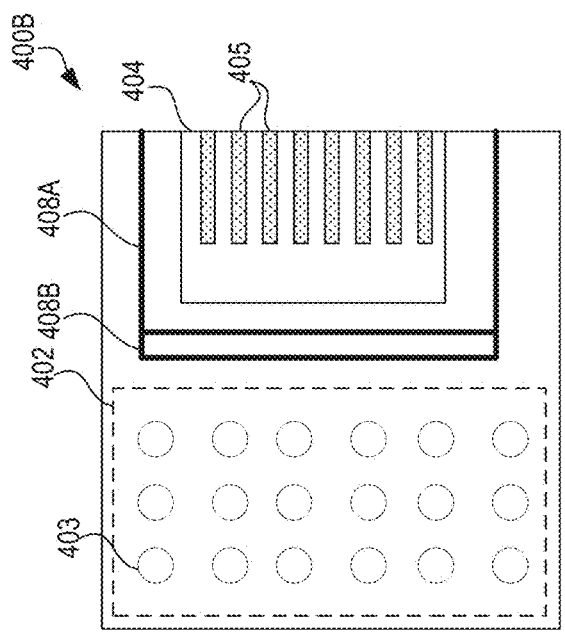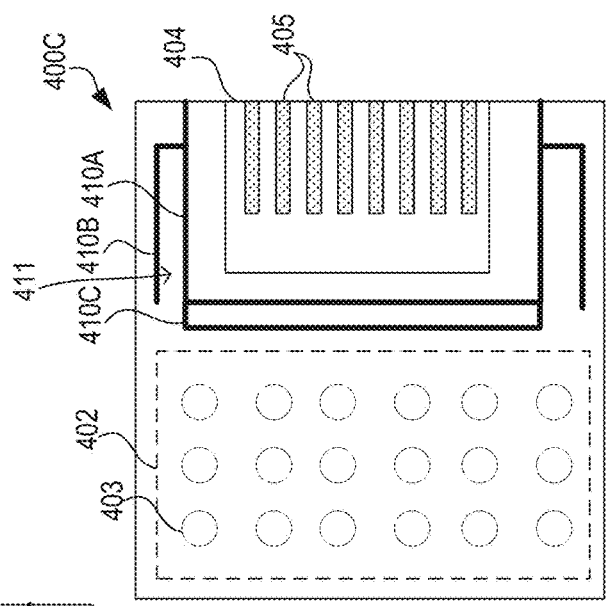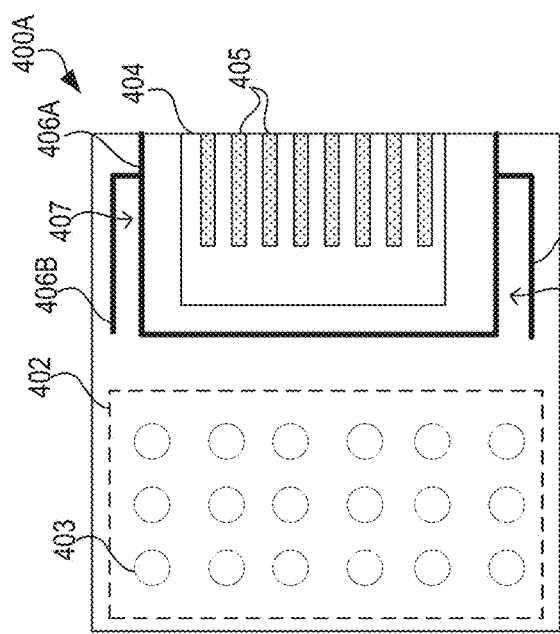

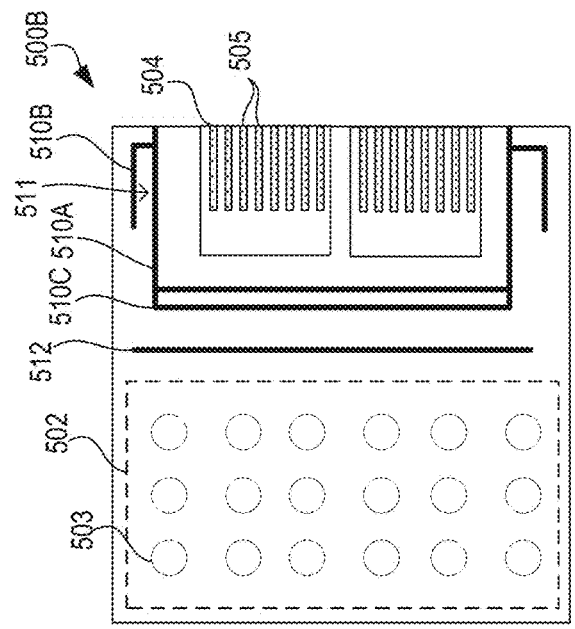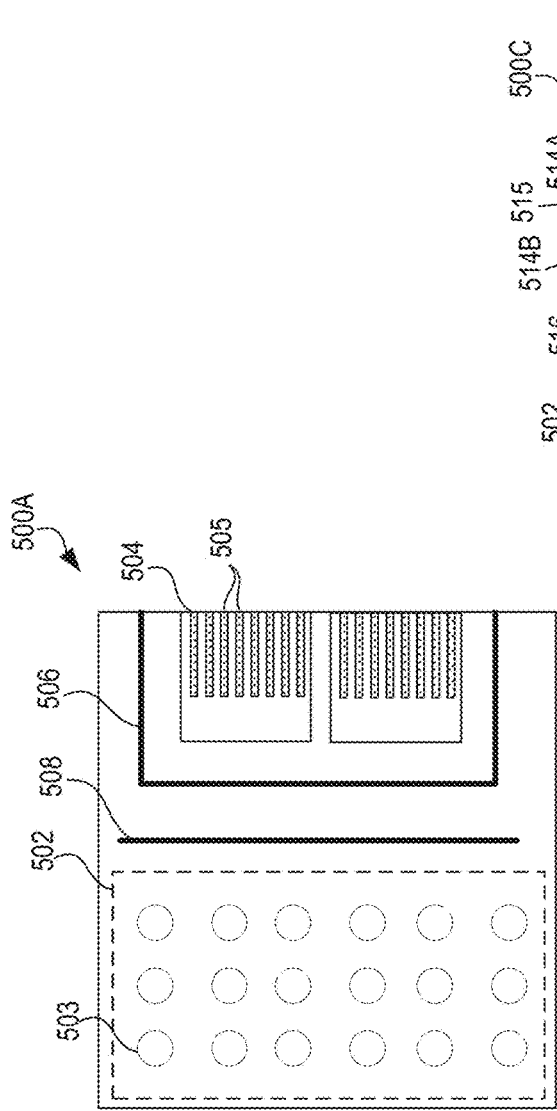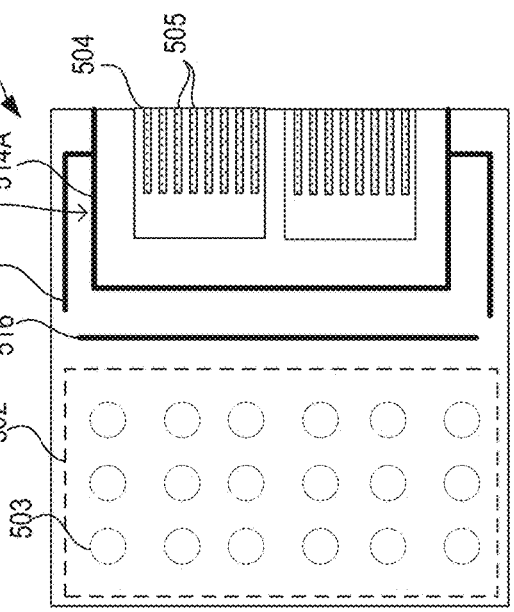
FIG. 5B
FIG. 5C
FIG. 5A

KEEP-OUT ZONE (KOZ) BARRIERS TO PREVENT EPOXY FLOW INTO V-GROOVE ZONE ON PHOTONICS DIE

BACKGROUND

V-grooves are incorporated into photonics die to enable passive optical fiber alignment during attachment of the fiber. In current photonics architectures, the photonics die may hang over the edge of a substrate so that the v-groove zone of the die can be accessed by the optical fiber. However, because of this overhang, in some instances, underfill epoxy may overflow into v-groove zone, causing one or more issues.

BRIEF DESCRIPTION OF THE DRAWINGS

FIGS. 1A-1B illustrate an example photonic die with a v-groove interface for coupling with fiber optic cables FIGS. 2A-2B illustrate an example photonics die that includes a v-groove KOZ barrier in accordance with embodiments of the present disclosure.

FIGS. 4A-4C illustrate example v-groove KOZ barrier embodiments in accordance with embodiments of the present disclosure.

FIGS. 5A-5C illustrate additional example v-groove KOZ barrier embodiments in accordance with embodiments of the present disclosure.

DETAILED DESCRIPTION

Figure 3A:
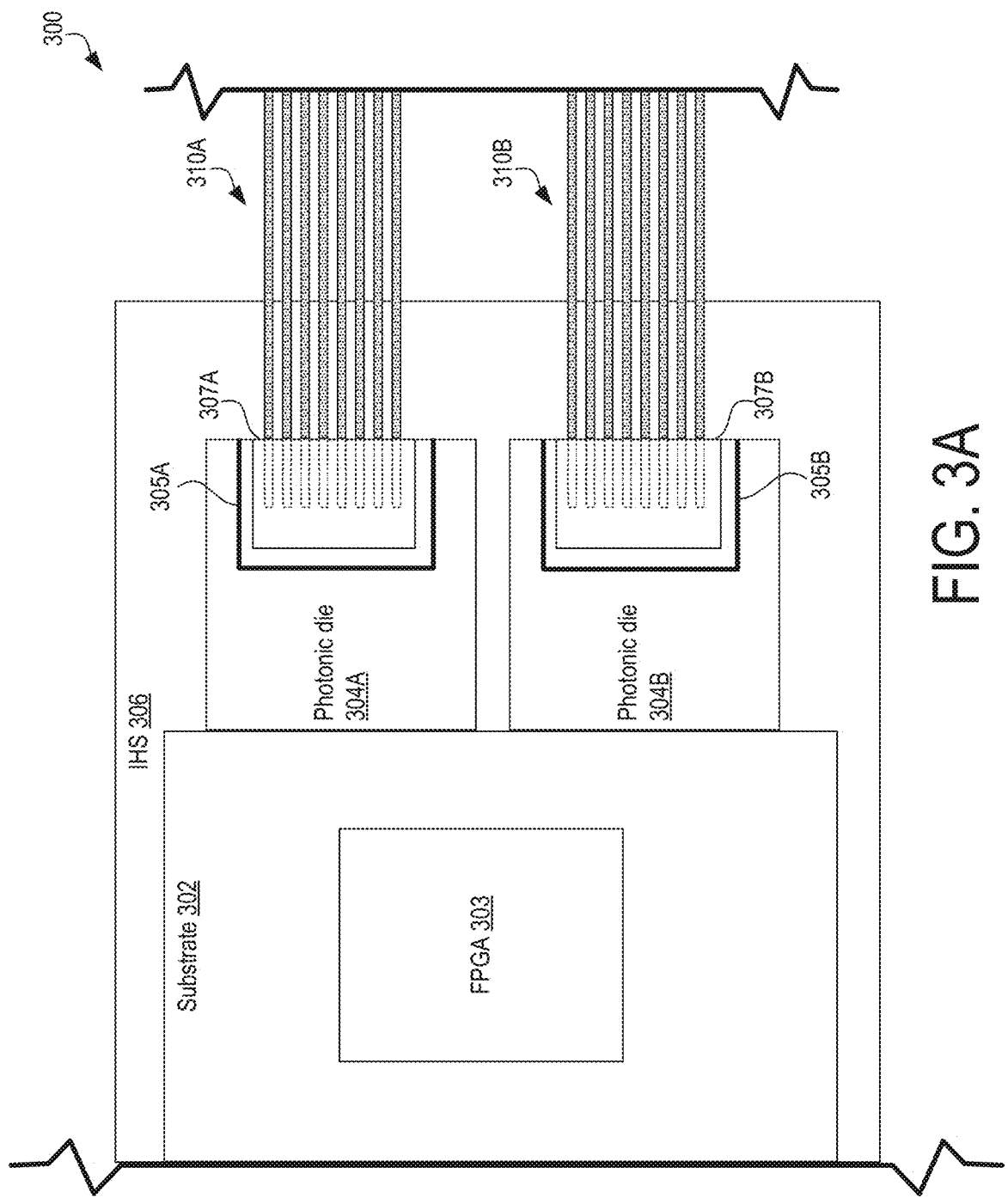
FIGS. 3A-3B illustrate an example system that includes photonics dies with v-groove KOZ barriers in accordance with embodiments of the present disclosure.

V-grooves are incorporated into photonics die to enable passive optical fiber alignment during attachment of the fiber. In current photonics architectures, the photonics die may hang over the edge of a substrate so that the v-groove zone of the die can be accessed by the optical fiber. However, because of this overhang, in some instances, underfill epoxy may overflow into v-groove zone, causing one or more issues. Current techniques to prevent this include dispensing barrier materials on the substrate to control the epoxy flow. However, the width and/or position control of the barrier material dispensation is difficult and requires a large keep-out-zone (KOZ) around the v-grooves to work.

Accordingly, embodiments of the present disclosure include barriers around the v-grooves of the photonics die, e.g., around a v-groove KOZ of the die to prevent epoxy overflow. The barrier may be added during the fabrication process of the photonic die, e.g., during a bumping process for the die, making the control of the barrier material deposition much easier. For example, the barrier material may be coated or plated during the bumping process of the photonics die, using polyimide or copper. In some instances, the barrier may include different dam or trench features. Embodiments of the present disclosure may provide better dimension/position control for the fabrication of these barriers, which can reduce the distance/area needed between the bump area of the photonics die and the v-groove area of the die and may lead to potential cost savings in photonics die designs (e.g., via the prevention of dies being ruined via epoxy overflow).

FIGS. 1A-1B illustrate an example photonic die 102 with a v-groove interface for coupling with fiber optic cables. In particular, FIG. 1A illustrates a top view of the photonic die, and FIG. 1B illustrates a cross-sectional view of the v-groove area of the photonic die 102. The example photonic die 102 includes a number of v-grooves 104 at an edge of the die 102 that allow a number of fiber optic cables (e.g., 103) to self-align with an optical path provided by an optical interconnect 105, which optically couples the fiber optic cables and the opto-electronic elements 106, and accordingly, provides the optical signals from the fiber optic cables to opto-electronic elements 106 of the die 102. The opto-electronic elements 106 may include one or more optical elements, e.g., optical multiplexers, optical demultiplexers, optical gratings, etc., in addition to opto-electronic elements, e.g., photodetectors.

To prevent alignment issues with the fiber optic cables, it is critical to prevent materials, such as underfill epoxy, from entering the v-groove area of the die 102. Thus, a keep-out-zone (KOZ) 110 may be defined in certain instances. The KOZ 110 may define an area of the die 102 that requires no other components or materials therein to maintain the self-alignment capabilities of the v-grooves 104. Thus, in particular embodiments, photonic dies (e.g., 102) may incorporate a barrier around the KOZ 110 that prevents materials such as underfill epoxy from entering the KOZ 110 during manufacturing or assembly processes.

FIGS. 2A-2B illustrate an example photonics die 202 that includes a v-groove KOZ barrier 205 in accordance with embodiments of the present disclosure. In particular, FIG. 2A illustrates a top view of the example photonics die 202, and FIG. 2B illustrates a cross-sectional view of the example photonics die 202. The example photonics die 202 may be implemented similar to the die 102 of FIGS. 1A-1B (other than the inclusion of the barrier 205). As shown, the die 202 includes a bump region 203, which refers to an area under the die 202 in which metal bumps 207 for attachment to a substrate (e.g., as shown in FIG. 3B) are located. In a typical chip attachment process, the photonics die 202 may be attached to the substrate and then an underfill epoxy material may be filled in between the die and the substrate. Later, fiber optic cables may be attached to the die/inserted into the v-grooves of the die 202. In some instances, when there is no v-groove KOZ barrier (like 205) in place, the epoxy may overflow past the bump area 203 and into the v-groove KOZ 206 (which is similar to the KOZ 110 of FIGS. 1A-1B), potentially filling or partially filling the v-grooves 204 and preventing proper attachment of the fiber optic cables.

Accordingly, a v-groove KOZ barrier 205 may be patterned on the die 202, e.g., to serve as an epoxy overflow barrier and to prevent such occurrences. The barrier 205 may be made from any suitable material that can be patterned during the fabrication of the die 202. In some embodiments, for example, the barrier 205 may be made from polyimide that is photo-patterned during the bumping process of the die 202. In other embodiments, the barrier 205 may be made of copper (or another metal) that is coated or plated during the bumping process for the die 202 (e.g., as part of the bumping process to plate copper pillars for bumps/interconnects). In the example shown, the barrier 205 is a single wall dam structure that surrounds the entirety of the v-groove KOZ 206 on the die 202 (i.e., on the three sides of the KOZ 206 that interface with the die 202). Although one example v-groove KOZ barrier 205 is shown, other types of barriers may be implemented, e.g., as described further below. The height of the barrier 205 may be of a suitable height to prevent epoxy overflow from the bump region 203 into the KOZ 206. For example, in some embodiments, the barrier height may be approximately the same as the height of the metal bumps 207 inside the bump region 203.

Figure 3B:
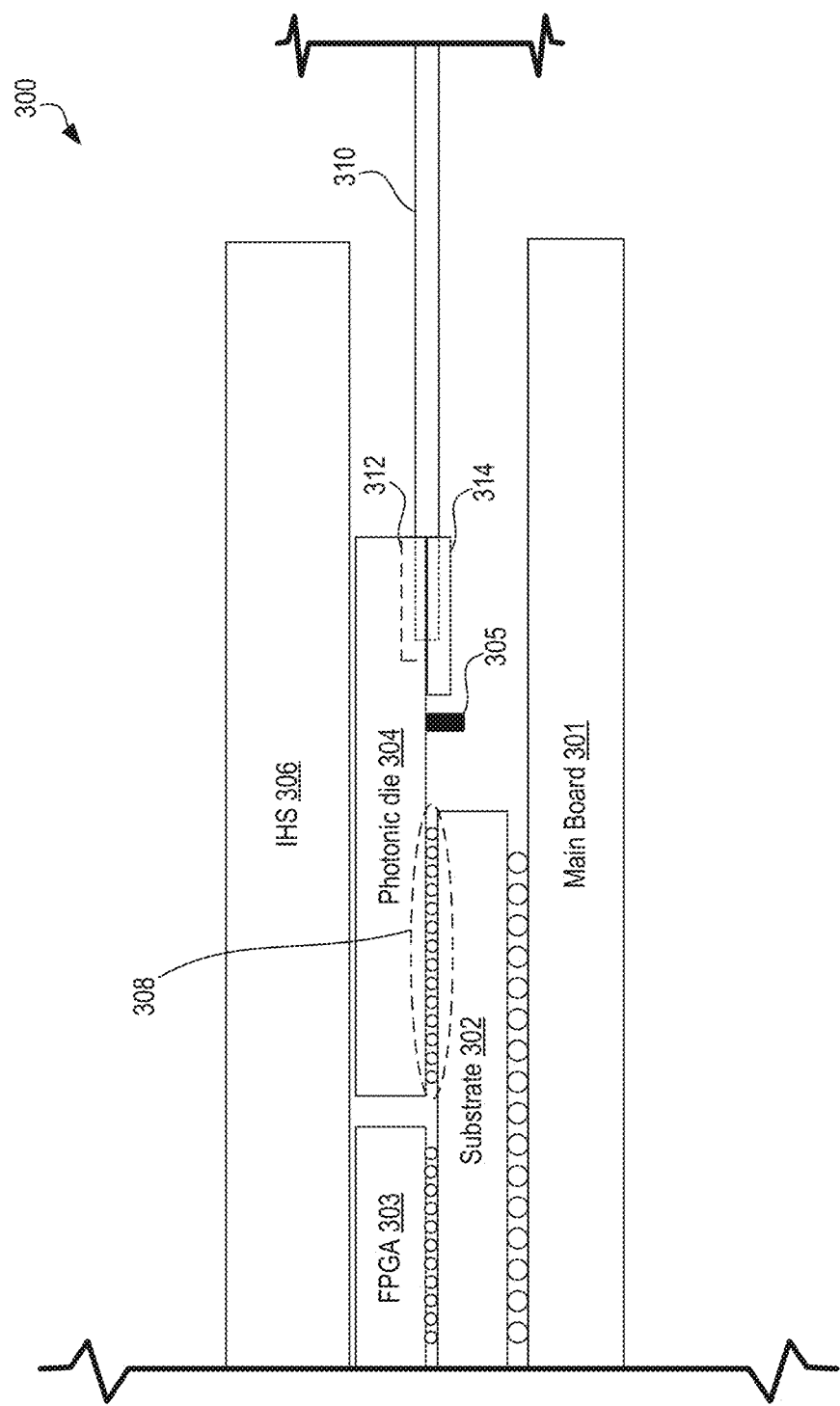

FIGS. 3A-3B illustrate an example system 300 that includes photonics dies 304 with v-groove KOZ barriers 305 in accordance with embodiments of the present disclosure. In particular, FIG. 3A illustrates a top view of the example system 300, and FIG. 3B illustrates a cross-sectional view of the example system 300. The example photonics dies 304 in the system 300 may be implemented similar to the die 102 of FIGS. 1A-1B (other than the inclusion of the barriers 305). For instance, the dies 304 may each include optoelectronic elements, e.g., photodetectors, to convert optical signals received from fiber optic cables 310 to electrical signals, and/or passive optical elements, e.g., optical multiplexers, optical de-multiplexers, gratings, etc. to modify/alter the optical signals.

The photonics dies 304 are coupled to a substrate 302 along with a field programmable gate array (FPGA) 303, and the substrate 302 is coupled to a main board 301 (e.g., a motherboard). The FPGA 303 may include circuitry that receives electrical signals from the photonics dies 304, processes such electrical signals, and/or performs other operations based on the electrical signals. For example, the FPGA 303 may include one or more amplifiers (e.g., transimpedance amplifiers), analog-to-digital converters, digital signal processors, or other logic circuitry. Collectively, the substrate 302, FPGA 303, and photonics die may be considered as a chip package, which may include additional dies or components than those shown in FIGS. 3A-3B.

The example system 300 additionally includes an integrated heat sink (IHS) 306 coupled to the tops of the FPGA 303 and the photonics dies 304 (e.g., via a thermal interface material). The example system further includes fiber optic cables 310 that are coupled to the photonics dies 304 via the v-grooves 312 of the dies 304 (e.g., which may be similar to those shown in FIG. 1B). The fiber optic cables 310 are held securely in place by a lid 314. As shown, the example photonics dies 304 include v-groove KOZ barriers 305 around the v-groove KOZs 307. The example system 300 may include additional, fewer, or other components than those shown in FIGS. 3A-3B.

As previously described, during attachment of the photonic dies 304 to the substrate 302, which may occur before attachment of the fiber optic cables 310 to the dies 304, an epoxy underfill material may be deposited in the bump region 308 between the dies 304 and the substrate 302 (e.g., similar to the bump region 203 of FIG. 2) and the epoxy material may overflow from the area toward the v-groove area, potentially filling or partially filling the v-grooves of the dies 304. This could cause misalignment of the fiber optic cables 310, or otherwise prevent the fiber optic cables 310 from being properly attached to the dies 304. Accordingly, the photonics dies 304 include the v-groove KOZ barriers 305 to prevent such issues from occurring, as any epoxy overflow from the bump region 308 can be blocked and/or diverted by the barriers 305.

FIGS. 4A-4C illustrate example v-groove KOZ barrier embodiments in accordance with embodiments of the present disclosure. In each of the examples shown in FIGS. 4A-4C, there is a photonic die 400 that includes a bump region 402 and a v-groove KOZ region 404 at an edge of the die 400. There are a number of metal bumps 403 on a surface of the die 400 (e.g., connected to bonding pads of the die 400) inside the bump region 402, and a number of v-grooves 405 formed (e.g., etched) in the surface of the die 400 inside the v-groove KOZ 404. In each example, there is a different KOZ barrier formation, which may be a material deposited on the surface of the die 400, e.g., polyimide, copper, or another suitable material, that prevents the flow of epoxy or other fluids from the bump region 402 into the v-groove KOZ 404.

In the example shown in FIG. 4A, the die 400 includes a KOZ barrier formation 406 with a first portion 406A that surrounds the v-groove KOZ 404 (like the barriers 305 of FIGS. 3A-3B) and second portions 406B that extend from a side of the first portion 406A and form reservoir areas 407 in which overflowing epoxy may pool after being re-directed by the first portion 406A.

In the example shown in FIG. 4B, the die 400 includes a KOZ barrier formation 408 with a first portion 408A that surrounds the v-groove KOZ 404 (like the barriers 305 of FIGS. 3A-3B) and a second portion 408B that acts as an additional dam-like barrier in addition to that of the first portion 408A.

In the example shown in FIG. 4C, the die 400 includes a KOZ barrier formation 410 that include features of both FIGS. 4A and 4B. That is, the KOZ barrier formation 410 includes a first portion 410A that surrounds the v-groove KOZ 404 (like the barriers 305 of FIGS. 3A-3B), second portions 410B that extend from a side of the first portion 410A and form reservoir areas 411 similar to the reservoir areas 407 of FIG. 4A, as well as a third portion 410C that acts as an additional dam-like barrier between the bump region 402 and the KOZ 404.

FIGS. 5A-5C illustrate additional example v-groove KOZ barrier embodiments in accordance with embodiments of the present disclosure. In each of the examples shown in FIGS. 5A-5C, there is a photonic die 500 that includes a bump region 502 and two v-groove KOZ regions 504 at an edge of the die 500. There are a number of metal bumps 503 on a surface of the die 500 (e.g., connected to bonding pads of the die 500) on a surface of the die 500 inside the bump region 502, and a number of v-grooves 505 formed (e.g., etched) in the surface of the die 500 inside each of the v-groove KOZs 504. In each example, there is a different KOZ barrier formation, which may be a material deposited on the surface of the die 500, e.g., polyimide, copper, or another suitable material, that prevents the flow of epoxy or other fluids from the bump region 502 into the v-groove KOZ 504.

In the example shown in FIG. 5A, the die 500 includes a first KOZ barrier formation 506 that surrounds the v-groove KOZ 504 (like the barriers 305 of FIGS. 3A-3B) and a second KOZ barrier formation 508 between the bump region 502 and the first barrier formation 506.

In the example shown in FIG. 5B, the die 500 includes a first KOZ barrier formation 510 that surrounds the v-groove KOZ 504 (like the barriers 305 of FIGS. 3A-3B). The first KOZ barrier formation 510 includes a first portion 510A that surrounds the v-groove KOZ 504, second portions 510B that extend from a side of the first portion 510A and form reservoir areas 511 similar to the reservoir areas 407 of FIG. 4A, as well as a third portion 510C that acts as an additional dam-like barrier. The die 500 also includes a second KOZ barrier formation 512 between the bump region 502 and the first barrier formation 510.

In the example shown in FIG. 5C, the die 500 includes a first KOZ barrier formation 514 that surrounds the v-groove KOZ 504 (like the barriers 305 of FIGS. 3A-3B) and a second KOZ barrier formation 516 between the bump region 502 and the first barrier formation 514. The first KOZ barrier formation 514 includes a first portion 514A that surrounds the v-groove KOZ 504, and second portions 514B that extend from a side of the first portion 514A and form reservoir areas 515 similar to the reservoir areas 407 of FIG. 4A and 511 of FIG. 5B.

In any of the examples shown, the KOZ barrier formations may be formed in an area of the die that is to overhang from an edge of a substrate to which the die is to attach, while the bump regions may be in the area that is to overlap with the substrate (e.g., as shown in FIG. 3B). Furthermore, in any of the example shown, the KOZ barrier formations may be at least a certain distance away from the bump region of the die. For example, in some embodiments, the closest barrier of the KOZ barrier formation may be at least 500 um away from the bump region of the die. It will be understood that the figures described above may not be to scale, and that certain features in the figures may have different dimensions or relative dimensions than those shown. For example, the wing portions of the KOZ barriers (e.g., 406B, 410B, 510B, 514B) may be of any suitable length. As another example, the length of the barrier formations 508, 512, 516 may be larger or smaller than shown. Further, the distance between two different barrier formations (e.g., between 506 and 508) may be larger or smaller than shown.

Figure 6A:
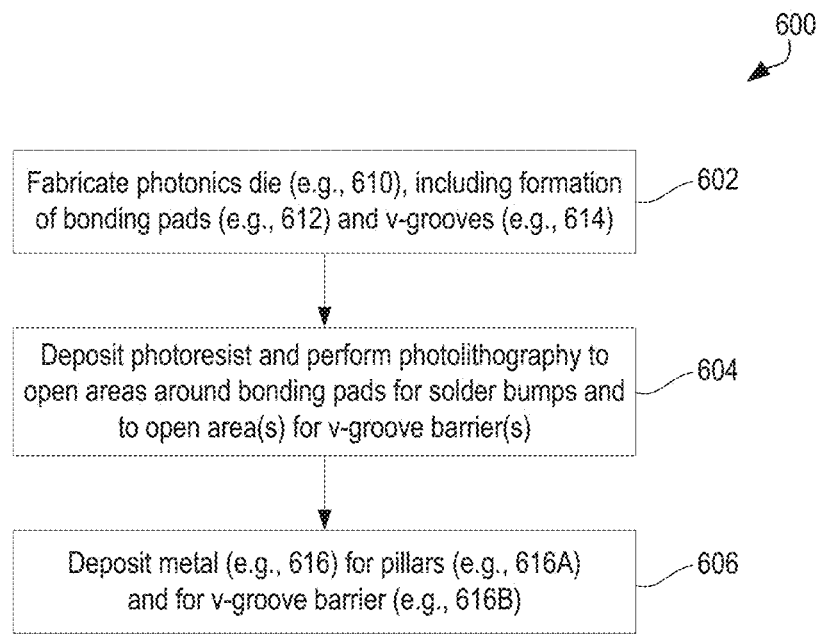
FIGS. 6A-6B illustrate an example flow diagram of an example v-groove KOZ barrier fabrication processes and a corresponding photonics die in accordance with embodiments of the present disclosure.
Figure 6B:
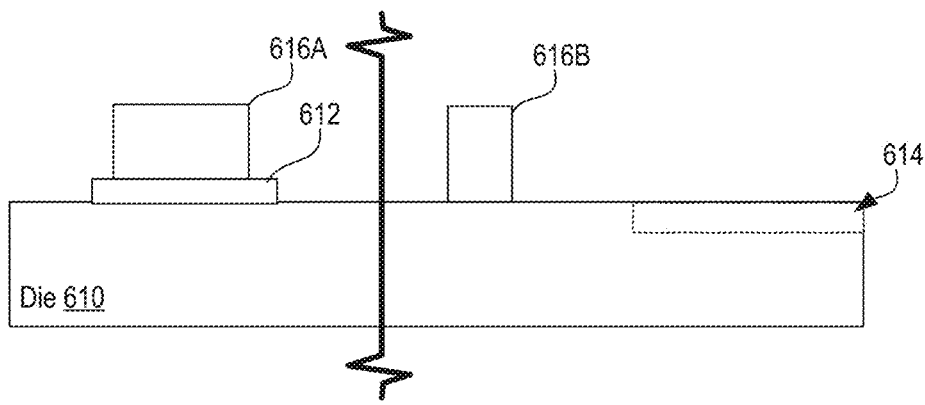

FIGS. 6A-6B illustrate an example flow diagram of an example v-groove KOZ barrier fabrication processes 600 and a corresponding photonics die 610 in accordance with embodiments of the present disclosure. The operations of the process 600 may be performed using any suitable semiconductor fabrication techniques. For example, material deposition—such as depositing layers, filling portions of layers (e.g., removed portions), and filling via openings—may be performed using any suitable deposition techniques, including, for example, chemical vapor deposition (CVD), metalorganic chemical vapor deposition (MOCVD), molecular beam epitaxy (MBE) atomic layer deposition (ALD), and/or physical vapor deposition (PVD). Moreover, patterning and removal—such as interconnect patterning, forming via openings, and shaping—may be performed using any suitable techniques, such as lithography-based patterning/masking and/or etching. Furthermore, additional, fewer, or other operations may be incorporated into the process 600 to fabricate v-groove KOZ barriers in accordance with embodiments of the present disclosure.

In the example process 600 of FIG. 6A, the v-groove KOZ barrier(s) are formed from a metal that is used to form pillars for bumping. At 602, a photonics die (e.g., 202, 304, 400, 500) is first fabricated. The photonics die fabrication includes formation (e.g., deposition) of bonding pads on a surface of the die, as well as formation (e.g., via etching) of v-grooves in the surface of the die. The bonding pads and the v-grooves may be on the same surface of the die. For example, referring to the example shown in FIG. 3B, the bonding pads and v-grooves may be on the bottom side of the photonics die 304.

At 604, photolithography is performed to open areas around the bonding pads of the photonics die (e.g., areas in the bumps regions 402, 502 of FIGS. 4, 5) and to open one or more areas for the v-groove KOZ barrier. This may include deposition of a photoresist material, i.e., a photo-patternable material (e.g., polyimide), on the photonics die, photo-patterning to harden desired areas of the photo-resist, and then removing other areas of the photo-resist based on the photo patterning.

At 606, a metal is deposited into the areas opened during the photolithography performed at to form metal pillars/bumps to which solder may attach during the bump formation and/or chip attach process, and to form the v-groove KOZ barrier around the v-grooves of the photonics die. The metal may be any suitable metal, and in some embodiments, may include copper. After the metal deposition at 606, the remaining photo-resist may be removed, e.g., through chemical etching or another suitable process.

Figure 7A:
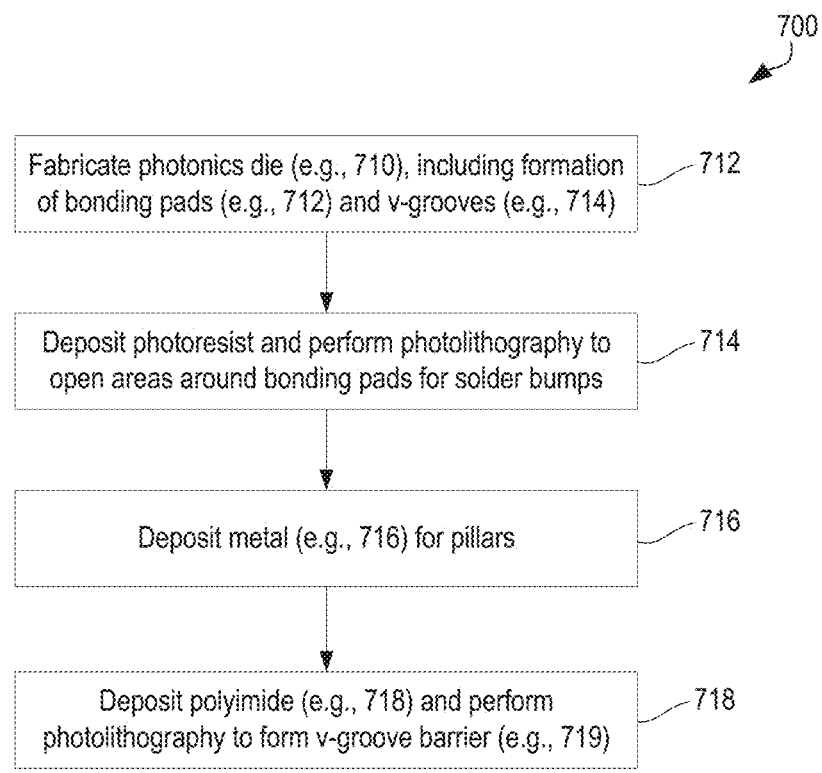
FIGS. 7A-7B illustrate another example flow diagram of an example v-groove KOZ barrier fabrication processes and a corresponding photonics die in accordance with embodiments of the present disclosure.
Figure 7B:
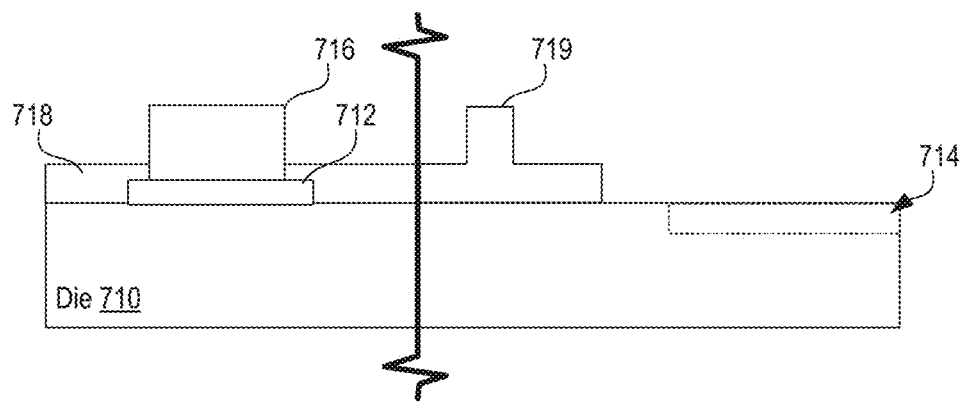

FIGS. 7A-7B illustrate an example flow diagram of an example v-groove KOZ barrier fabrication processes 700 and a corresponding photonics die 710 in accordance with embodiments of the present disclosure. The operations of the process 700 may be performed using any suitable semiconductor fabrication techniques. For example, material deposition—such as depositing layers, filling portions of layers (e.g., removed portions), and filling via openings—may be performed using any suitable deposition techniques, including, for example, chemical vapor deposition (CVD), metalorganic chemical vapor deposition (MOCVD), molecular beam epitaxy (MBE) atomic layer deposition (ALD), and/or physical vapor deposition (PVD). Moreover, patterning and removal—such as interconnect patterning, forming via openings, and shaping—may be performed using any suitable techniques, such as lithography-based patterning/masking and/or etching. Furthermore, additional, fewer, or other operations may be incorporated into the process 700 to fabricate v-groove KOZ barriers in accordance with embodiments of the present disclosure.

In the example process 700, the v-groove KOZ barrier(s) are formed from a passivation material (e.g., polyimide) that is deposited during the bumping process of the photonics die, e.g., after formation of the metal pillars/bumps. At 702, a photonics die (e.g., 202, 304, 400, 500) is first fabricated. The photonics die fabrication includes formation (e.g., deposition) of bonding pads on a surface of the die, as well as formation (e.g., via etching) of v-grooves in the surface of the die. The bonding pads and the v-grooves may be on the same surface of the die. For example, referring to the example shown in FIG. 3B, the bonding pads and v-grooves may be on the bottom side of the photonics die 304.

At 704, photolithography is performed to open areas around the bonding pads of the photonics die (e.g., areas in the bumps regions 402, 502 of FIGS. 4, 5) and to form the v-groove KOZ barrier. This may include deposition of a photoresist material, i.e., a photo-patternable material (e.g., polyimide), on the photonics die, photo-patterning to harden desired areas of the photo-resist, and then removing other areas of the photo-resist based on the photo patterning.

At 706, a metal is deposited into the areas opened during the photolithography performed at to form metal pillars for the solder bumps to attach during the bump formation and/or chip attach process. The metal may be any suitable metal, and in some embodiments, may include copper. After the metal deposition at 706, the remaining photo-resist may be removed, e.g., through chemical etching or another suitable process.

At 708, a polyimide layer is deposited on the surface of the photonics die, and photolithography is performed to form the v-groove KOZ barrier(s) on the die. For example, the photolithography may remove all portions of the polyimide passivation layer other than those desired for the v-groove KOZ barrier.

Figure 8:
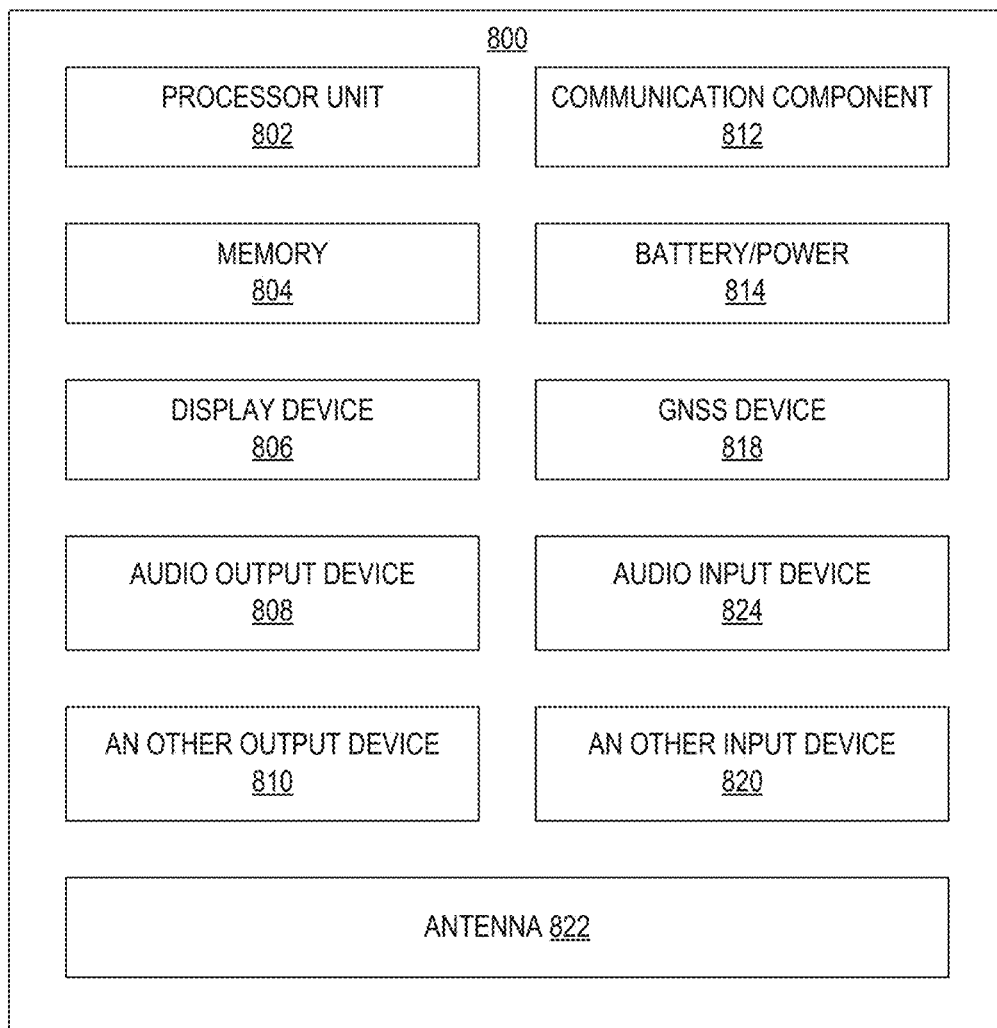
FIG. 8 illustrates a block diagram of an example electrical device that may include one or more embodiments of the disclosure.

FIG. 8 illustrates a block diagram of an example electrical device 800 that may include one or more of the embodiments disclosed herein. For example, any suitable ones of the components of the electrical device 800—such as processor units 802, memory 804, communication components 812 (e.g., network interface controllers, RF front-end circuits)—may include one or more of the group III-nitride (III-N) transistors described herein (e.g., GaN-based HEMT devices fabricated using a $Cp_2Mg$ pre-flow stage as described above). A number of components are illustrated in FIG. 8 as included in the electrical device 800, but any one or more of these components may be omitted or duplicated, as suitable for the application. In some embodiments, some or all of the components included in the electrical device 800 may be attached to one or more motherboards mainboards, or system boards. In some embodiments, one or more of these components are fabricated onto a single system-on-a-chip (SoC) die.

Additionally, in various embodiments, the electrical device 800 may not include one or more of the components illustrated in FIG. 8, but the electrical device 800 may include interface circuitry for coupling to the one or more components. For example, the electrical device 800 may not include a display device 806, but may include display device interface circuitry (e.g., a connector and driver circuitry) to which a display device 806 may be coupled. In another set of examples, the electrical device 800 may not include an audio input device 824 or an audio output device 808, but may include audio input or output device interface circuitry (e.g., connectors and supporting circuitry) to which an audio input device 824 or audio output device 808 may be coupled.

The electrical device 800 may include one or more processor units 802 (e.g., one or more processor units). As used herein, the terms "processor unit", "processing unit" or "processor" may refer to any device or portion of a device that processes electronic data from registers and/or memory to transform that electronic data into other electronic data that may be stored in registers and/or memory. The processor unit 802 may include one or more digital signal processors (DSPs), application-specific integrated circuits (ASICs), central processing units (CPUs), graphics processing units (GPUs), general-purpose GPUs (GPGPUs), accelerated processing units (APUs), field-programmable gate arrays (FPGAs), neural network processing units (NPUs), data processor units (DPUs), accelerators (e.g., graphics accelerator, compression accelerator, artificial intelligence accelerator), controller cryptoprocessors (specialized processors that execute cryptographic algorithms within hardware), server processors, controllers, or any other suitable type of processor units. As such, the processor unit can be referred to as an XPU (or xPU).

The electrical device 800 may include a memory 804, which may itself include one or more memory devices such as volatile memory (e.g., dynamic random access memory (DRAM), static random-access memory (SRAM)), non-volatile memory (e.g., read-only memory (ROM), flash memory, chalcogenide-based phase-change non-voltage memories), solid state memory, and/or a hard drive. In some embodiments, the memory 804 may include memory that is located on the same integrated circuit die as the processor unit 802. This memory may be used as cache memory (e.g., Level 1 (L1), Level 2 (L2), Level 3 (L3), Level 4 (L4), Last Level Cache (LLC)) and may include embedded dynamic random access memory (eDRAM) or spin transfer torque magnetic random access memory (STT-MRAM).

In some embodiments, the electrical device 800 can comprise one or more processor units 802 that are heterogeneous or asymmetric to another processor unit 802 in the electrical device 800. There can be a variety of differences between the processing units 802 in a system in terms of a spectrum of metrics of merit including architectural, microarchitectural, thermal, power consumption characteristics, and the like. These differences can effectively manifest themselves as asymmetry and heterogeneity among the processor units 802 in the electrical device 800.

In some embodiments, the electrical device 800 may include a communication component 812 (e.g., one or more communication components). For example, the communication component 812 can manage wireless communications for the transfer of data to and from the electrical device 800. The term "wireless" and its derivatives may be used to describe circuits, devices, systems, methods, techniques, communications channels, etc., that may communicate data through the use of modulated electromagnetic radiation through a nonsolid medium. The term "wireless" does not imply that the associated devices do not contain any wires, although in some embodiments they might not.

The communication component 812 may implement any of a number of wireless standards or protocols, including but not limited to Institute for Electrical and Electronic Engineers (IEEE) standards including Wi-Fi (IEEE 802.11 family), IEEE 802.16 standards (e.g., IEEE 802.16-2005 Amendment), Long-Term Evolution (LTE) project along with any amendments, updates, and/or revisions (e.g., advanced LTE project, ultra mobile broadband (UMB) project (also referred to as "3GPP2"), etc.). IEEE 802.16 compatible Broadband Wireless Access (BWA) networks are generally referred to as WiMAX networks, an acronym that stands for Worldwide Interoperability for Microwave Access, which is a certification mark for products that pass conformity and interoperability tests for the IEEE 802.16 standards. The communication component 812 may operate in accordance with a Global System for Mobile Communication (GSM), General Packet Radio Service (GPRS), Universal Mobile Telecommunications System (UMTS), High Speed Packet Access (HSPA), Evolved HSPA (E-HSPA), or LTE network. The communication component 812 may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication component 812 may operate in accordance with Code Division Multiple Access (CDMA), Time Division Multiple Access (TDMA), Digital Enhanced Cordless Telecommunications (DECT), Evolution-Data Optimized (EV-DO), and derivatives thereof, as well as any other wireless protocols that are designated as 3G, 4G, 5G, and beyond. The communication component 812 may operate in accordance with other wireless protocols in other embodiments. In some embodiments, the communication component 812 may include a radio-frequency (RF) front-end circuit. The electrical device 800 may include an antenna 822 to facilitate wireless communications and/or to receive other wireless communications (such as AM or FM radio transmissions).

In some embodiments, the communication component 812 may manage wired communications, such as electrical, optical, or any other suitable communication protocols (e.g., IEEE 802.3 Ethernet standards). As noted above, the communication component 812 may include multiple communication components. For instance, a first communication component 812 may be dedicated to shorter-range wireless communications such as Wi-Fi or Bluetooth, and a second communication component 812 may be dedicated to longer-range wireless communications such as global positioning system (GPS), EDGE, GPRS, CDMA, WiMAX, LTE, EV-DO, or others. In some embodiments, a first communication component 812 may be dedicated to wireless communications, and a second communication component 812 may be dedicated to wired communications. In some embodiments, the communication component 812 may include a network interface controller.

The electrical device 800 may include battery/power circuitry 814. The battery/power circuitry 814 may include one or more energy storage devices (e.g., batteries or capacitors) and/or circuitry for coupling components of the electrical device 800 to an energy source separate from the electrical device 800 (e.g., AC line power).

The electrical device 800 may include a display device 806 (or corresponding interface circuitry, as discussed above). The display device 806 may include one or more embedded or wired or wirelessly connected external visual indicators, such as a heads-up display, a computer monitor, a projector, a touchscreen display, a liquid crystal display (LCD), a light-emitting diode display, or a flat panel display.

The electrical device 800 may include an audio output device 808 (or corresponding interface circuitry, as discussed above). The audio output device 808 may include any embedded or wired or wirelessly connected external device that generates an audible indicator, such speakers, headsets, or earbuds.

The electrical device 800 may include an audio input device 824 (or corresponding interface circuitry, as discussed above). The audio input device 824 may include any embedded or wired or wirelessly connected device that generates a signal representative of a sound, such as microphones, microphone arrays, or digital instruments (e.g., instruments having a musical instrument digital interface (MIDI) output). The electrical device 800 may include a Global Navigation Satellite System (GNSS) device 818 (or corresponding interface circuitry, as discussed above), such as a Global Positioning System (GPS) device. The GNSS device 818 may be in communication with a satellite-based system and may determine a geolocation of the electrical device 800 based on information received from one or more GNSS satellites, as known in the art.

The electrical device 800 may include other output device(s) 810 (or corresponding interface circuitry, as discussed above). Examples of the other output device(s) 810 may include an audio codec, a video codec, a printer, a wired or wireless transmitter for providing information to other devices, or an additional storage device.

The electrical device 800 may include other input device(s) 820 (or corresponding interface circuitry, as discussed above). Examples of the other input device(s) 820 may include an accelerometer, a gyroscope, a compass, an image capture device (e.g., monoscopic or stereoscopic camera), a trackball, a trackpad, a touchpad, a keyboard, a cursor control device such as a mouse, a stylus, a touchscreen, proximity sensor, microphone, a bar code reader, a Quick Response (QR) code reader, electrocardiogram (ECG) sensor, PPG (photoplethysmogram) sensor, galvanic skin response sensor, any other sensor, or a radio frequency identification (RFID) reader.

The electrical device 800 may have any desired form factor, such as a hand-held or mobile electrical device (e.g., a cell phone, a smart phone, a mobile internet device, a music player, a tablet computer, a laptop computer, a 2-in-1 convertible computer, a portable all-in-one computer, a netbook computer, an ultrabook computer, a personal digital assistant (PDA), an ultra mobile personal computer, a portable gaming console, etc.), a desktop electrical device, a server, a rack-level computing solution (e.g., blade, tray or sled computing systems), a workstation or other networked computing component, a printer, a scanner, a monitor, a set-top box, an entertainment control unit, a stationary gaming console, smart television, a vehicle control unit, a digital camera, a digital video recorder, a wearable electrical device or an embedded computing system (e.g., computing systems that are part of a vehicle, smart home appliance, consumer electronics product or equipment, manufacturing equipment). In some embodiments, the electrical device 800 may be any other electronic device that processes data. In some embodiments, the electrical device 800 may comprise multiple discrete physical components. Given the range of devices that the electrical device 800 can be manifested as in various embodiments, in some embodiments, the electrical device 800 can be referred to as a computing device or a computing system.

Figure 9:
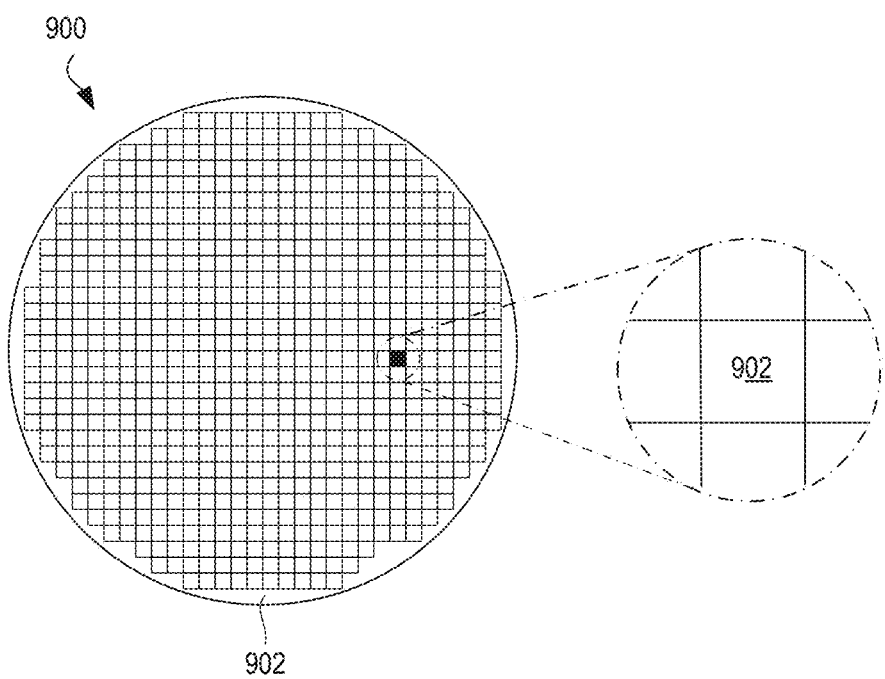
FIG. 9 is a top view of a wafer and dies that may be included in a microelectronic assembly, in accordance with any of the embodiments disclosed herein.

FIG. 9 is a top view of a wafer 900 and dies 902 that may be included in any of the embodiments disclosed herein. The wafer 900 may be composed of semiconductor material and may include one or more dies 902 having integrated circuit structures formed on a surface of the wafer 900. The individual dies 902 may be a repeating unit of an integrated circuit product that includes any suitable integrated circuit. After the fabrication of the semiconductor product is complete, the wafer 900 may undergo a singulation process in which the dies 902 are separated from one another to provide discrete "chips" of the integrated circuit product. The die 902 may be any of the dies disclosed herein. The die 902 may include one or more transistors (e.g., a GaN-based HEMT device, e.g., 100, fabricated using a $Cp_2Mg$ pre-flow stage as described with respect to FIG. 2 and/or the transistors 1040 of FIG. 10), supporting circuitry to route electrical signals to the transistors, passive components (e.g., signal traces, resistors, capacitors, or inductors), and/or any other integrated circuit components. In some embodiments, the wafer 900 or the die 902 may include a memory device (e.g., a random access memory (RAM) device, such as a static RAM (SRAM) device, a magnetic RAM (MRAM) device, a resistive RAM (RRAM) device, a conductive-bridging RAM (CBRAM) device, etc.), a logic device (e.g., an AND, OR, NAND, or NOR gate), or any other suitable circuit element. Multiple ones of these devices may be combined on a single die 902. For example, a memory array formed by multiple memory devices may be formed on a same die 902 as a processor unit (e.g., the processor unit 802 of FIG. 8) or other logic that is configured to store information in the memory devices or execute instructions stored in the memory array. Various ones of the microelectronic assemblies disclosed herein may be manufactured using a die-to-wafer assembly technique in which some dies are attached to a wafer 900 that include others of the dies, and the wafer 900 is subsequently singulated.

Figure 10:
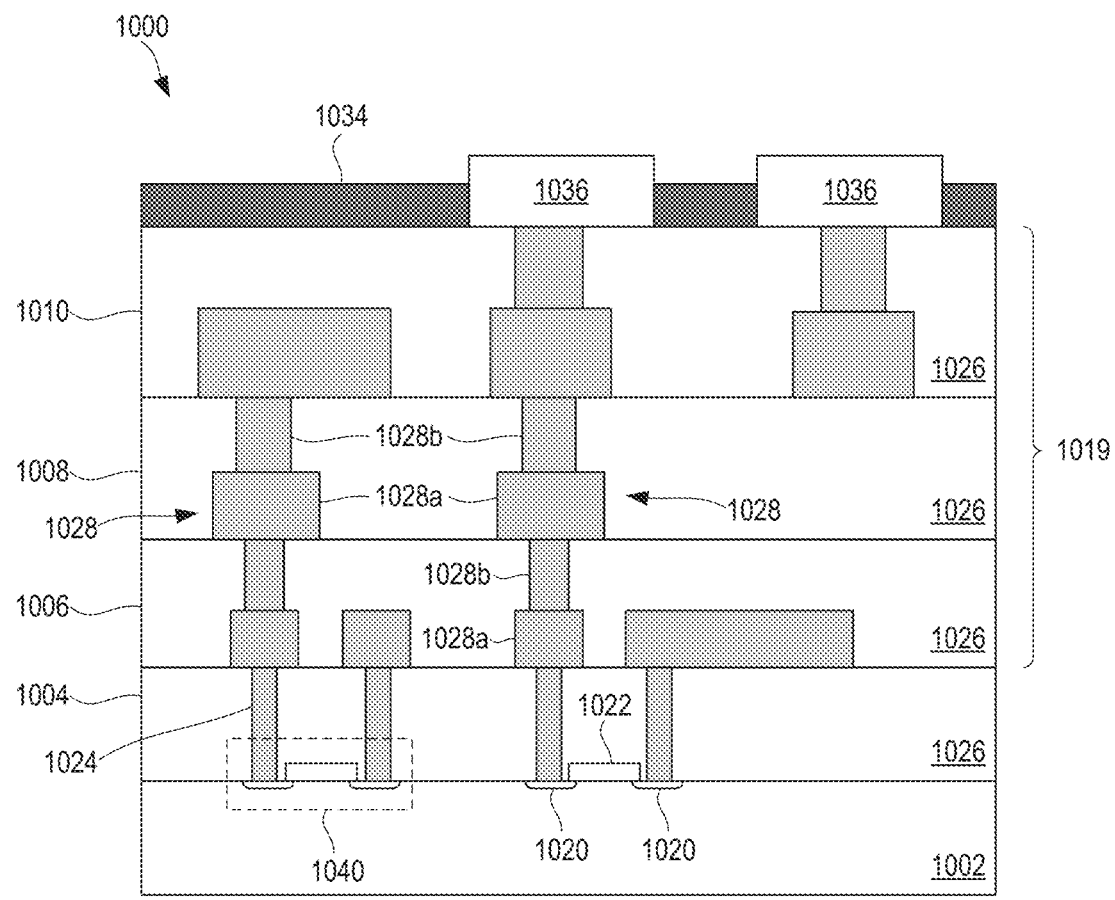
FIG. 10 is a cross-sectional side view of an integrated circuit device that may be included in a microelectronic assembly, in accordance with any of the embodiments disclosed herein.

FIG. 10 is a cross-sectional side view of an integrated circuit device 1000 that may be included in any of the embodiments disclosed herein (e.g., in any of the dies). One or more of the integrated circuit devices 1000 may be included in one or more dies 902 (FIG. 9). The integrated circuit device 1000 may be formed on a die substrate 1002 (e.g., the wafer 900 of FIG. 9) and may be included in a die (e.g., the die 902 of FIG. 9). The die substrate 1002 may be a semiconductor substrate composed of semiconductor material systems including, for example, n-type or p-type materials systems (or a combination of both). The die substrate 1002 may include, for example, a crystalline substrate formed using a bulk silicon or a silicon-on-insulator (SOI) substructure. In some embodiments, the die substrate 1002 may be formed using alternative materials, which may or may not be combined with silicon, that include, but are not limited to, germanium, indium antimonide, lead telluride, indium arsenide, indium phosphide, gallium arsenide, or gallium antimonide. Further materials classified as group II-VI, III-V, or IV may also be used to form the die substrate 1002. Although a few examples of materials from which the die substrate 1002 may be formed are described here, any material that may serve as a foundation for an integrated circuit device 1000 may be used. The die substrate 1002 may be part of a singulated die (e.g., the dies 902 of FIG. 9) or a wafer (e.g., the wafer 900 of FIG. 9).

The integrated circuit device 1000 may include one or more device layers 1004 disposed on the die substrate 1002. The device layer 1004 may include features of one or more transistors 1040 (e.g., metal oxide semiconductor field-effect transistors (MOSFETs)) formed on the die substrate 1002. The transistors 1040 may include, for example, one or more source and/or drain (S/D) regions 1020, a gate 1022 to control current flow between the S/D regions 1020, and one or more S/D contacts 1024 to route electrical signals to/from the S/D regions 1020. The transistors 1040 may include additional features not depicted for the sake of clarity, such as device isolation regions, gate contacts, and the like. The transistors 1040 are not limited to the type and configuration depicted in FIG. 10 and may include a wide variety of other types and configurations such as, for example, planar transistors, non-planar transistors, or a combination of both. Non-planar transistors may include FinFET transistors, such as double-gate transistors or tri-gate transistors, and wraparound or all-around gate transistors, such as nanoribbon, nanosheet, or nanowire transistors.

Returning to FIG. 10, a transistor 1040 may include a gate 1022 formed of at least two layers, a gate dielectric and a gate electrode. The gate dielectric may include one layer or a stack of layers. The one or more layers may include silicon oxide, silicon dioxide, silicon carbide, and/or a high-k dielectric material.

The high-k dielectric material may include elements such as hafnium, silicon, oxygen, titanium, tantalum, lanthanum, aluminum, zirconium, barium, strontium, yttrium, lead, scandium, niobium, and zinc. Examples of high-k materials that may be used in the gate dielectric include, but are not limited to, hafnium oxide, hafnium silicon oxide, lanthanum oxide, lanthanum aluminum oxide, zirconium oxide, zirconium silicon oxide, tantalum oxide, titanium oxide, barium strontium titanium oxide, barium titanium oxide, strontium titanium oxide, yttrium oxide, aluminum oxide, lead scandium tantalum oxide, and lead zinc niobate. In some embodiments, an annealing process may be carried out on the gate dielectric to improve its quality when a high-k material is used.

The gate electrode may be formed on the gate dielectric and may include at least one p-type work function metal or n-type work function metal, depending on whether the transistor 1040 is to be a p-type metal oxide semiconductor (PMOS) or an n-type metal oxide semiconductor (NMOS) transistor. In some implementations, the gate electrode may consist of a stack of two or more metal layers, where one or more metal layers are work function metal layers and at least one metal layer is a fill metal layer. Further metal layers may be included for other purposes, such as a barrier layer.

For a PMOS transistor, metals that may be used for the gate electrode include, but are not limited to, ruthenium, palladium, platinum, cobalt, nickel, conductive metal oxides (e.g., ruthenium oxide), and any of the metals discussed below with reference to an NMOS transistor (e.g., for work function tuning). For an NMOS transistor, metals that may be used for the gate electrode include, but are not limited to, hafnium, zirconium, titanium, tantalum, aluminum, alloys of these metals, carbides of these metals (e.g., hafnium carbide, zirconium carbide, titanium carbide, tantalum carbide, and aluminum carbide), and any of the metals discussed above with reference to a PMOS transistor (e.g., for work function tuning).

In some embodiments, when viewed as a cross-section of the transistor 1040 along the source-channel-drain direction, the gate electrode may consist of a U-shaped structure that includes a bottom portion substantially parallel to the surface of the die substrate 1002 and two sidewall portions that are substantially perpendicular to the top surface of the die substrate 1002. In other embodiments, at least one of the metal layers that form the gate electrode may simply be a planar layer that is substantially parallel to the top surface of the die substrate 1002 and does not include sidewall portions substantially perpendicular to the top surface of the die substrate 1002. In other embodiments, the gate electrode may consist of a combination of U-shaped structures and planar, non-U-shaped structures. For example, the gate electrode may consist of one or more U-shaped metal layers formed atop one or more planar, non-U-shaped layers.

In some embodiments, a pair of sidewall spacers may be formed on opposing sides of the gate stack to bracket the gate stack. The sidewall spacers may be formed from materials such as silicon nitride, silicon oxide, silicon carbide, silicon nitride doped with carbon, and silicon oxynitride. Processes for forming sidewall spacers are well known in the art and generally include deposition and etching process steps. In some embodiments, a plurality of spacer pairs may be used; for instance, two pairs, three pairs, or four pairs of sidewall spacers may be formed on opposing sides of the gate stack.

The S/D regions 1020 may be formed within the die substrate 1002 adjacent to the gate 1022 of individual transistors 1040. The S/D regions 1020 may be formed using an implantation/diffusion process or an etching/deposition process, for example. In the former process, dopants such as boron, aluminum, antimony, phosphorous, or arsenic may be ion-implanted into the die substrate 1002 to form the S/D regions 1020. An annealing process that activates the dopants and causes them to diffuse farther into the die substrate 1002 may follow the ion-implantation process. In the latter process, the die substrate 1002 may first be etched to form recesses at the locations of the S/D regions 1020. An epitaxial deposition process may then be carried out to fill the recesses with material that is used to fabricate the S/D regions 1020. In some implementations, the S/D regions 1020 may be fabricated using a silicon alloy such as silicon germanium or silicon carbide. In some embodiments, the epitaxially deposited silicon alloy may be doped in situ with dopants such as boron, arsenic, or phosphorous. In some embodiments, the S/D regions 1020 may be formed using one or more alternate semiconductor materials such as germanium or a group III-V material or alloy. In further embodiments, one or more layers of metal and/or metal alloys may be used to form the S/D regions 1020.

Electrical signals, such as power and/or input/output (I/O) signals, may be routed to and/or from the devices (e.g., transistors 1040) of the device layer 1004 through one or more interconnect layers disposed on the device layer 1004 (illustrated in FIG. 10 as interconnect layers 1006-1010). For example, electrically conductive features of the device layer 1004 (e.g., the gate 1022 and the S/D contacts 1024) may be electrically coupled with the interconnect structures 1028 of the interconnect layers 1006-1010. The one or more interconnect layers 1006-1010 may form a metallization stack (also referred to as an "ILD stack") 1019 of the integrated circuit device 1000.

The interconnect structures 1028 may be arranged within the interconnect layers 1006-1010 to route electrical signals according to a wide variety of designs; in particular, the arrangement is not limited to the particular configuration of interconnect structures 1028 depicted in FIG. 10. Although a particular number of interconnect layers 1006-1010 is depicted in FIG. 10, embodiments of the present disclosure include integrated circuit devices having more or fewer interconnect layers than depicted.

In some embodiments, the interconnect structures 1028 may include lines 1028a and/or vias 1028b filled with an electrically conductive material such as a metal. The lines 1028a may be arranged to route electrical signals in a direction of a plane that is substantially parallel with a surface of the die substrate 1002 upon which the device layer 1004 is formed. For example, the lines 1028a may route electrical signals in a direction in and out of the page and/or in a direction across the page from the perspective of FIG. 10. The vias 1028b may be arranged to route electrical signals in a direction of a plane that is substantially perpendicular to the surface of the die substrate 1002 upon which the device layer 1004 is formed. In some embodiments, the vias 1028b may electrically couple lines 1028a of different interconnect layers 1006-1010 together.

The interconnect layers 1006-1010 may include a dielectric material 1026 disposed between the interconnect structures 1028, as shown in FIG. 10. In some embodiments, dielectric material 1026 disposed between the interconnect structures 1028 in different ones of the interconnect layers 1006-1010 may have different compositions; in other embodiments, the composition of the dielectric material 1026 between different interconnect layers 1006-1010 may be the same. The device layer 1004 may include a dielectric material 1026 disposed between the transistors 1040 and a bottom layer of the metallization stack as well. The dielectric material 1026 included in the device layer 1004 may have a different composition than the dielectric material 1026 included in the interconnect layers 1006-1010; in other embodiments, the composition of the dielectric material 1026 in the device layer 1004 may be the same as a dielectric material 1026 included in any one of the interconnect layers 1006-1010.

A first interconnect layer 1006 (referred to as Metal 1 or "M1") may be formed directly on the device layer 1004. In some embodiments, the first interconnect layer 1006 may include lines 1028a and/or vias 1028b, as shown. The lines 1028a of the first interconnect layer 1006 may be coupled with contacts (e.g., the S/D contacts 1024) of the device layer 1004. The vias 1028b of the first interconnect layer 1006 may be coupled with the lines 1028a of a second interconnect layer 1008.

The second interconnect layer 1008 (referred to as Metal 2 or "M2") may be formed directly on the first interconnect layer 1006. In some embodiments, the second interconnect layer 1008 may include via 1028b to couple the lines 1028 of the second interconnect layer 1008 with the lines 1028a of a third interconnect layer 1010. Although the lines 1028a and the vias 1028b are structurally delineated with a line within individual interconnect layers for the sake of clarity, the lines 1028a and the vias 1028b may be structurally and/or materially contiguous (e.g., simultaneously filled during a dual-damascene process) in some embodiments.

The third interconnect layer 1010 (referred to as Metal 3 or "M3") (and additional interconnect layers, as desired) may be formed in succession on the second interconnect layer 1008 according to similar techniques and configurations described in connection with the second interconnect layer 1008 or the first interconnect layer 1006. In some embodiments, the interconnect layers that are "higher up" in the metallization stack 1019 in the integrated circuit device 1000 (i.e., farther away from the device layer 1004) may be thicker that the interconnect layers that are lower in the metallization stack 1019, with lines 1028a and vias 1028b in the higher interconnect layers being thicker than those in the lower interconnect layers.

The integrated circuit device 1000 may include a solder resist material 1034 (e.g., polyimide or similar material) and one or more conductive contacts 1036 formed on the interconnect layers 1006-1010. In FIG. 10, the conductive contacts 1036 are illustrated as taking the form of bond pads. The conductive contacts 1036 may be electrically coupled with the interconnect structures 1028 and configured to route the electrical signals of the transistor(s) 1040 to external devices. For example, solder bonds may be formed on the one or more conductive contacts 1036 to mechanically and/or electrically couple an integrated circuit die including the integrated circuit device 1000 with another component (e.g., a printed circuit board). The integrated circuit device 1000 may include additional or alternate structures to route the electrical signals from the interconnect layers 1006-1010; for example, the conductive contacts 1036 may include other analogous features (e.g., posts) that route the electrical signals to external components. The conductive contacts 1036 may serve as any of the conductive contacts described throughout this disclosure.

In some embodiments in which the integrated circuit device 1000 is a double-sided die, the integrated circuit device 1000 may include another metallization stack (not shown) on the opposite side of the device layer(s) 1004. This metallization stack may include multiple interconnect layers as discussed above with reference to the interconnect layers 1006-1010, to provide conductive pathways (e.g., including conductive lines and vias) between the device layer(s) 1004 and additional conductive contacts (not shown) on the opposite side of the integrated circuit device 1000 from the conductive contacts 1036. These additional conductive contacts may serve as any of the conductive contacts described throughout this disclosure.

In other embodiments in which the integrated circuit device 1000 is a double-sided die, the integrated circuit device 1000 may include one or more through silicon vias (TSVs) through the die substrate 1002; these TSVs may make contact with the device layer(s) 1004, and may provide conductive pathways between the device layer(s) 1004 and additional conductive contacts (not shown) on the opposite side of the integrated circuit device 1000 from the conductive contacts 1036. These additional conductive contacts may serve as any of the conductive contacts described throughout this disclosure. In some embodiments, TSVs extending through the substrate can be used for routing power and ground signals from conductive contacts on the opposite side of the integrated circuit device 1000 from the conductive contacts 1036 to the transistors 1040 and any other components integrated into the die 1000, and the metallization stack 1019 can be used to route I/O signals from the conductive contacts 1036 to transistors 1040 and any other components integrated into the die 1000.

Multiple integrated circuit devices 1000 may be stacked with one or more TSVs in the individual stacked devices providing connection between one of the devices to any of the other devices in the stack. For example, one or more high-bandwidth memory (HBM) integrated circuit dies can be stacked on top of a base integrated circuit die and TSVs in the HBM dies can provide connection between the individual HBM and the base integrated circuit die. Conductive contacts can provide additional connections between adjacent integrated circuit dies in the stack. In some embodiments, the conductive contacts can be fine-pitch solder bumps (microbumps).

Figure 11:
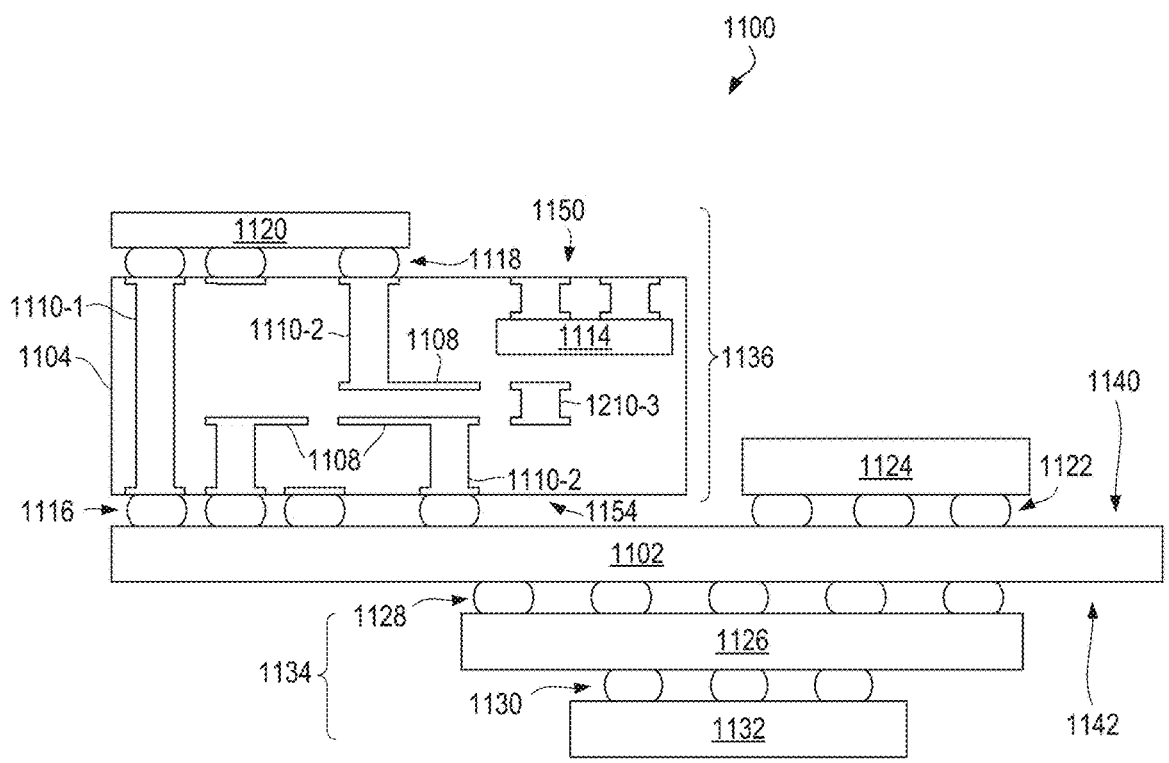
FIG. 11 is a cross-sectional side view of an integrated circuit device assembly that may include a microelectronic assembly, in accordance with any of the embodiments disclosed herein.

FIG. 11 is a cross-sectional side view of an integrated circuit device assembly 1100 that may include any of the embodiments disclosed herein. In some embodiments, the integrated circuit device assembly 1100 may be a microelectronic assembly. The integrated circuit device assembly 1100 includes a number of components disposed on a circuit board 1102 (which may be a motherboard, system board, mainboard, etc.). The integrated circuit device assembly 1100 includes components disposed on a first face 1140 of the circuit board 1102 and an opposing second face 1142 of the circuit board 1102; generally, components may be disposed on one or both faces 1140 and 1142. Any of the integrated circuit components discussed below with reference to the integrated circuit device assembly 1100 may take the form of any suitable ones of the embodiments of the microelectronic assemblies 100 disclosed herein.

In some embodiments, the circuit board 1102 may be a printed circuit board (PCB) including multiple metal (or interconnect) layers separated from one another by layers of dielectric material and interconnected by electrically conductive vias. The individual metal layers comprise conductive traces. Any one or more of the metal layers may be formed in a desired circuit pattern to route electrical signals (optionally in conjunction with other metal layers) between the components coupled to the circuit board 1102. In other embodiments, the circuit board 1102 may be a non-PCB substrate. The integrated circuit device assembly 1100 illustrated in FIG. 11 includes a package-on-interposer structure 1136 coupled to the first face 1140 of the circuit board 1102 by coupling components 1116. The coupling components 1116 may electrically and mechanically couple the package-on-interposer structure 1136 to the circuit board 1102, and may include solder balls (as shown in FIG. 11), pins (e.g., as part of a pin grid array (PGA), contacts (e.g., as part of a land grid array (LGA)), male and female portions of a socket, an adhesive, an underfill material, and/or any other suitable electrical and/or mechanical coupling structure. The coupling components 1116 may serve as the coupling components illustrated or described for any of the substrate assembly or substrate assembly components described herein, as appropriate.

The package-on-interposer structure 1136 may include an integrated circuit component 1120 coupled to an interposer 1104 by coupling components 1118. The coupling components 1118 may take any suitable form for the application, such as the forms discussed above with reference to the coupling components 1116. Although a single integrated circuit component 1120 is shown in FIG. 11, multiple integrated circuit components may be coupled to the interposer 1104; indeed, additional interposers may be coupled to the interposer 1104. The interposer 1104 may provide an intervening substrate used to bridge the circuit board 1102 and the integrated circuit component 1120.

The integrated circuit component 1120 may be a packaged or unpacked integrated circuit product that includes one or more integrated circuit dies (e.g., the die 902 of FIG. 9, the integrated circuit device 1000 of FIG. 10) and/or one or more other suitable components. A packaged integrated circuit component comprises one or more integrated circuit dies mounted on a package substrate with the integrated circuit dies and package substrate encapsulated in a casing material, such as a metal, plastic, glass, or ceramic. In one example of an unpackaged integrated circuit component 1120, a single monolithic integrated circuit die comprises solder bumps attached to contacts on the die. The solder bumps allow the die to be directly attached to the interposer 1104. The integrated circuit component 1120 can comprise one or more computing system components, such as one or more processor units (e.g., system-on-a-chip (SoC), processor core, graphics processor unit (GPU), accelerator, chipset processor), I/O controller, memory, or network interface controller. In some embodiments, the integrated circuit component 1120 can comprise one or more additional active or passive devices such as capacitors, decoupling capacitors, resistors, inductors, fuses, diodes, transformers, sensors, electrostatic discharge (ESD) devices, and memory devices.

In embodiments where the integrated circuit component 1120 comprises multiple integrated circuit dies, they dies can be of the same type (a homogeneous multi-die integrated circuit component) or of two or more different types (a heterogeneous multi-die integrated circuit component). A multi-die integrated circuit component can be referred to as a multi-chip package (MCP) or multi-chip module (MCM).

In addition to comprising one or more processor units, the integrated circuit component 1120 can comprise additional components, such as embedded DRAM, stacked high bandwidth memory (HBM), shared cache memories, input/output (I/O) controllers, or memory controllers. Any of these additional components can be located on the same integrated circuit die as a processor unit, or on one or more integrated circuit dies separate from the integrated circuit dies comprising the processor units. These separate integrated circuit dies can be referred to as "chiplets". In embodiments where an integrated circuit component comprises multiple integrated circuit dies, interconnections between dies can be provided by the package substrate, one or more silicon interposers, one or more silicon bridges embedded in the package substrate (such as Intel® embedded multi-die interconnect bridges (EMIBs)), or combinations thereof.

Generally, the interposer 1104 may spread connections to a wider pitch or reroute a connection to a different connection. For example, the interposer 1104 may couple the integrated circuit component 1120 to a set of ball grid array (BGA) conductive contacts of the coupling components 1116 for coupling to the circuit board 1102. In the embodiment illustrated in FIG. 11, the integrated circuit component 1120 and the circuit board 1102 are attached to opposing sides of the interposer 1104; in other embodiments, the integrated circuit component 1120 and the circuit board 1102 may be attached to a same side of the interposer 1104. In some embodiments, three or more components may be interconnected by way of the interposer 1104.

In some embodiments, the interposer 1104 may be formed as a PCB, including multiple metal layers separated from one another by layers of dielectric material and interconnected by electrically conductive vias. In some embodiments, the interposer 1104 may be formed of an epoxy resin, a fiberglass-reinforced epoxy resin, an epoxy resin with inorganic fillers, a ceramic material, or a polymer material such as polyimide. In some embodiments, the interposer 1104 may be formed of alternate rigid or flexible materials that may include the same materials described above for use in a semiconductor substrate, such as silicon, germanium, and other group III-V and group IV materials. The interposer 1104 may include metal interconnects 1108 and vias 1110, including but not limited to through hole vias 1110-1 (that extend from a first face 1150 of the interposer 1104 to a second face 1154 of the interposer 1104), blind vias 1110-2 (that extend from the first or second faces 1150 or 1154 of the interposer 1104 to an internal metal layer), and buried vias 1110-3 (that connect internal metal layers).

In some embodiments, the interposer 1104 can comprise a silicon interposer. Through silicon vias (TSV) extending through the silicon interposer can connect connections on a first face of a silicon interposer to an opposing second face of the silicon interposer. In some embodiments, an interposer 1104 comprising a silicon interposer can further comprise one or more routing layers to route connections on a first face of the interposer 1104 to an opposing second face of the interposer 1104.

The interposer 1104 may further include embedded devices 1114, including both passive and active devices. Such devices may include, but are not limited to, capacitors, decoupling capacitors, resistors, inductors, fuses, diodes, transformers, sensors, electrostatic discharge (ESD) devices, and memory devices. More complex devices such as radio frequency devices, power amplifiers, power management devices, antennas, arrays, sensors, and microelectromechanical systems (MEMS) devices may also be formed on the interposer 1104. The package-on-interposer structure 1136 may take the form of any of the package-on-interposer structures known in the art. In embodiments where the interposer is a non-printed circuit board The integrated circuit device assembly 1100 may include an integrated circuit component 1124 coupled to the first face 1140 of the circuit board 1102 by coupling components 1122. The coupling components 1122 may take the form of any of the embodiments discussed above with reference to the coupling components 1116, and the integrated circuit component 1124 may take the form of any of the embodiments discussed above with reference to the integrated circuit component 1120.

The integrated circuit device assembly 1100 illustrated in FIG. 11 includes a package-on-package structure 1134 coupled to the second face 1142 of the circuit board 1102 by coupling components 1128. The package-on-package structure 1134 may include an integrated circuit component 1126 and an integrated circuit component 1132 coupled together by coupling components 1130 such that the integrated circuit component 1126 is disposed between the circuit board 1102 and the integrated circuit component 1132. The coupling components 1128 and 1130 may take the form of any of the embodiments of the coupling components 1116 discussed above, and the integrated circuit components 1126 and 1132 may take the form of any of the embodiments of the integrated circuit component 1120 discussed above. The package-on-package structure 1134 may be configured in accordance with any of the package-on-package structures known in the art.

Illustrative examples of the technologies described throughout this disclosure are provided below. Embodiments of these technologies may include any one or more, and any combination of, the examples described below. In some embodiments, at least one of the systems or components set forth in one or more of the preceding figures may be configured to perform one or more operations, techniques, processes, and/or methods as set forth in the following examples.

Example 1 is a photonics die comprising: one or more opto-electronic elements to receive optical signals and generate electrical signals based on the optical signals; a plurality of v-grooves in a surface of the photonics die and at an edge of the die, each v-groove to interface with a fiber optic cable and align the fiber optic cable with an optical interconnect to optically couple the fiber optic cable with the opto-electronic elements; a plurality of bonding pads on the surface of the photonics die, each of the bonding pads electrically connected to the one or more opto-electronic elements; a plurality of metal bumps, each metal bump coupled to a respective bonding pad on the surface of the photonics die; and a barrier formation between the metal bumps and the plurality of v-grooves.

Example 2 includes the subject matter of Example 1, wherein the barrier formation comprises a metal.

Example 3 includes the subject matter of Example 2, wherein the metal includes copper.

Example 4 includes the subject matter of Example 1, wherein the barrier formation is in a passivation layer on the surface of the photonics die.

Example 5 includes the subject matter of Example 4, wherein the passivation layer comprises polyimide.

Example 6 includes the subject matter of any one of Examples 1-4, wherein the barrier formation comprises a portion surrounding the plurality of v-grooves.

Example 7 includes the subject matter of Example 6, wherein the portion of barrier formation surrounding the plurality of the v-grooves is a first portion, and the barrier formation further comprises a second portion extending from the first portion to form a reservoir area between the first and second portions.

Example 8 includes the subject matter of Example 6 or 7, wherein the portion of barrier formation surrounding the plurality of the v-grooves is a first portion, and the barrier formation further comprises a second portion connected to the first portion and between the first portion and the second portion.

Example 9 includes the subject matter of Example 8, wherein the second portion is parallel to at least a portion of the first portion.

Example 10 includes the subject matter of any one of Examples 1-9, wherein the barrier formation is a first barrier formation and the photonics die further comprises a second barrier formation between the first barrier formation and the metal bumps.

Example 11 includes the subject matter of any one of Examples 1-10, wherein the barrier formation is at least 500 um from the plurality of metal bumps.

Example 12 is a chip package comprising: a substrate; a first die coupled to the first die substrate, the first die comprising: one or more opto-electronic elements to receive optical signals and generate electrical signals based on the optical signals; a plurality of v-grooves in a surface of the first die and at an edge of the die, each v-groove to interface with a fiber optic cable and align the fiber optic cable with an optical interconnect to optically couple the fiber optic cable with the opto-electronic elements; a plurality of bonding pads on the surface of the first die, each of the bonding pads electrically connected to the one or more opto-electronic elements; a plurality of metal bumps, each metal bump coupled to a respective bonding pad on the surface of the first die, wherein the metal bumps are coupled to electrical contacts of the substrate via solder bumps; and a barrier formation between the metal bumps and the plurality of v-grooves; and a second die coupled to substrate, the second die comprising electronic circuitry to receive the electrical signals generated by the opto-electronic elements.

Example 13 includes the subject matter of Example 12, wherein the barrier formation comprises a metal.

Example 14 includes the subject matter of Example 13, wherein the metal includes copper.

Example 15 includes the subject matter of Example 12, wherein the barrier formation is in a passivation layer on the surface of the first die.

Example 16 includes the subject matter of Example 15, wherein the passivation layer comprises polyimide.

Example 17 includes the subject matter of any one of Examples 12-16, wherein the barrier formation comprises a portion surrounding the plurality of v-grooves.

Example 18 includes the subject matter of Example 17, wherein the portion of barrier formation surrounding the plurality of the v-grooves is a first portion, and the barrier formation further comprises a second portion extending from the first portion to form a reservoir area between the first and second portions.

Example 19 includes the subject matter of Example 17 or 18, wherein the portion of barrier formation surrounding the plurality of the v-grooves is a first portion, and the barrier formation further comprises a second portion connected to the first portion and between the first portion and the second portion.

Example 20 includes the subject matter of Example 19, wherein the second portion is parallel to at least a portion of the first portion.

Example 21 includes the subject matter of any one of Examples 12-20, wherein the barrier formation is a first barrier formation and the photonics die further comprises a second barrier formation between the first barrier formation and the metal bumps.

Example 22 includes the subject matter of any one of Examples 12-21, wherein the barrier formation is at least 500 um from the plurality of metal bumps.

Example 23 includes the subject matter of any one of Examples 12-22, wherein the electronic circuitry comprises a field programmable gate array.

Example 24 includes the subject matter of any one of Examples 12-23, further comprising a heat sink coupled to the first and second dies.

Example 25 is a system comprising: a main board; a chip package coupled to the main board, the chip package comprising a photonics die comprising: one or more opto-electronic elements to receive optical signals and generate electrical signals based on the optical signals; a plurality of v-grooves in a surface of the first die and at an edge of the die, each v-groove to interface with a fiber optic cable and align the fiber optic cable with an optical interconnect to optically couple the fiber optic cable with the opto-electronic elements; a plurality of bonding pads on the surface of the first die, each of the bonding pads electrically connected to the one or more opto-electronic elements; a plurality of metal bumps, each metal bump coupled to a respective bonding pad on the surface of the first die, wherein the metal bumps are coupled to electrical contacts of the substrate via solder bumps; and a barrier formation between the metal bumps and the plurality of v-grooves.

Example 26 includes the subject matter of Example 25, wherein the barrier formation comprises a metal.

Example 27 includes the subject matter of Example 26, wherein the metal includes copper.

Example 28 includes the subject matter of Example 25, wherein the barrier formation is in a passivation layer on the surface of the photonics die.

Example 29 includes the subject matter of Example 28, wherein the passivation layer comprises polyimide.

Example 30 includes the subject matter of any one of Examples 25-29, wherein the barrier formation comprises a portion surrounding the plurality of v-grooves.

Example 31 includes the subject matter of Example 30, wherein the portion of barrier formation surrounding the plurality of the v-grooves is a first portion, and the barrier formation further comprises a second portion extending from the first portion to form a reservoir area between the first and second portions.

Example 32 includes the subject matter of Example 30 or 31, wherein the portion of barrier formation surrounding the plurality of the v-grooves is a first portion, and the barrier formation further comprises a second portion connected to the first portion and between the first portion and the second portion.

Example 33 includes the subject matter of Example 32, wherein the second portion is parallel to at least a portion of the first portion.

Example 34 includes the subject matter of any one of Examples 25-33, wherein the barrier formation is a first barrier formation and the photonics die further comprises a second barrier formation between the first barrier formation and the metal bumps.

Example 35 includes the subject matter of any one of Examples 25-34, wherein the barrier formation is at least 500 um from the plurality of metal bumps.

Example 36 includes the subject matter of any one of Examples 25-35, wherein the chip package further comprises electronic circuitry to receive the electrical signals generated by the opto-electronic elements.

Example 37 includes the subject matter of any one of Examples 25-36, further comprising a set of fiber optic cables coupled to the first die via the v-grooves.

In the following description, various aspects of the illustrative implementations will be described using terms commonly employed by those skilled in the art to convey the substance of their work to others skilled in the art. However, it will be apparent to those skilled in the art that the present disclosure may be practiced with only some of the described aspects. For purposes of explanation, specific numbers, materials and configurations are set forth in order to provide a thorough understanding of the illustrative implementations. However, it will be apparent to one skilled in the art that the present disclosure may be practiced without the specific details. In other instances, well-known features are omitted or simplified in order not to obscure the illustrative implementations.

Various operations will be described as multiple discrete operations, in turn, in a manner that is most helpful in understanding the present disclosure. However, the order of description should not be construed to imply that these operations are necessarily order dependent. In particular, these operations may not be performed in the order of presentation.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The terms "over," "under," "between," "above," and "on" as used herein may refer to a relative position of one material layer or component with respect to other layers or components. For example, one layer disposed over or under another layer may be directly in contact with the other layer or may have one or more intervening layers. Moreover, one layer disposed between two layers may be directly in contact with the two layers or may have one or more intervening layers. In contrast, a first layer "on" a second layer is in direct contact with that second layer. Similarly, unless explicitly stated otherwise, one feature disposed between two features may be in direct contact with the adjacent features or may have one or more intervening features.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or more elements are in direct contact.

In various embodiments, the phrase "a first feature formed, deposited, or otherwise disposed on a second feature" may mean that the first feature is formed, deposited, or disposed over the second feature, and at least a part of the first feature may be in direct contact (e.g., direct physical and/or electrical contact) or indirect contact (e.g., having one or more other features between the first feature and the second feature) with at least a part of the second feature.

Where the disclosure recites "a" or "a first" element or the equivalent thereof, such disclosure includes one or more such elements, neither requiring nor excluding two or more such elements. Further, ordinal indicators (e.g., first, second, or third) for identified elements are used to distinguish between the elements, and do not indicate or imply a required or limited number of such elements, nor do they indicate a particular position or order of such elements unless otherwise specifically stated.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. As used herein, "computer-implemented method" may refer to any method executed by one or more processors, a computer system having one or more processors, a mobile device such as a smartphone (which may include one or more processors), a tablet, a laptop computer, a set-top box, a gaming console, and so forth.

The invention claimed is:

1. A photonics die comprising:
   one or more opto-electronic elements to receive optical signals and generate electrical signals based on the optical signals;
   a plurality of v-grooves in a surface of the photonics die and at an edge of the die, each v-groove to interface with a fiber optic cable and align the fiber optic cable with an optical interconnect to optically couple the fiber optic cable with the opto-electronic elements;
   a plurality of bonding pads on the surface of the photonics die, each of the bonding pads electrically connected to the one or more opto-electronic elements;
   a plurality of metal bumps, each metal bump coupled to a respective bonding pad on the surface of the photonics die; and
   a barrier formation between the metal bumps and the plurality of v-grooves, wherein a first portion of the barrier formation surrounds the plurality of v-grooves and a second portion of the barrier formation extends from the first portion to form a reservoir area between the first and second portions.

2. The photonics die of claim 1, wherein the barrier formation comprises a metal.

3. The photonics die of claim 2, wherein the metal includes copper.

4. The photonics die of claim 1, wherein the barrier formation is in a passivation layer on the surface of the photonics die.

5. The photonics die of claim 4, wherein the passivation layer comprises polyimide.

6. The photonics die of claim 1, wherein the barrier formation further comprises a third portion connected to the first portion and between the first portion and the metal bumps.

7. The photonics die of claim 6, wherein the third portion is parallel to at least a portion of the first portion.

8. The photonics die of claim 1, wherein the barrier formation is a first barrier formation and the photonics die further comprises a second barrier formation between the first barrier formation and the metal bumps.

9. The photonics die of claim 1, wherein the barrier formation is at least 500 µm from the plurality of metal bumps.

10. A chip package comprising:
    a substrate;
    a first die coupled to the substrate, the first die comprising:
       one or more opto-electronic elements to receive optical signals and generate electrical signals based on the optical signals;
       a plurality of v-grooves in a surface of the first die and at an edge of the die, each v-groove to interface with a fiber optic cable and align the fiber optic cable with an optical interconnect to optically couple the fiber optic cable with the opto-electronic elements;
       a plurality of bonding pads on the surface of the first die, each of the bonding pads electrically connected to the one or more opto-electronic elements;
       a plurality of metal bumps, each metal bump coupled to a respective bonding pad on the surface of the first die, wherein the metal bumps are coupled to electrical contacts of the substrate via solder bumps; and
       a barrier formation between the metal bumps and the plurality of v-grooves, wherein a first portion of the barrier formation surrounds the plurality of v-grooves on the first die, and the barrier formation further comprises a second portion extending from the first portion to form a reservoir area between the first and second portions; and a second die coupled to substrate, the second die comprising electronic circuitry to receive the electrical signals generated by the opto-electronic elements.

11. The chip package of claim 10, wherein the barrier formation comprises copper.

12. The chip package of claim 10, wherein the barrier formation is in a polyimide layer on the surface.

13. The chip package of claim 10, wherein the portion of barrier formation surrounding the plurality of the v-grooves is a first portion, and the barrier formation further comprises a second portion connected to the first portion and between the first portion and the second portion.

14. The chip package of claim 13, wherein the second portion is parallel to at least a portion of the first portion.

15. The chip package of claim 10, wherein the barrier formation is a first barrier formation and the first die further comprises a second barrier formation between the first barrier formation and the metal bumps.

16. The chip package of claim 10, wherein the electronic circuitry comprises a field programmable gate array.

17. The chip package of claim 10, further comprising a heat sink coupled to the first and second dies.

18. The chip package of claim 10, wherein the barrier formation further comprises a third portion connected to the first portion, the third portion between the first portion and the metal bumps.

19. The chip package of claim 18, wherein the third portion is parallel to at least a portion of the first portion.

20. A system comprising:
a main board;
a chip package coupled to the main board, the chip package comprising a photonics die comprising:
one or more opto-electronic elements to receive optical signals and generate electrical signals based on the optical signals;
a plurality of v-grooves in a surface of the photonics die and at an edge of the die, each v-groove to interface with a fiber optic cable and align the fiber optic cable with an optical interconnect to optically couple the fiber optic cable with the opto-electronic elements;
a plurality of bonding pads on the surface of the photonics die, each of the bonding pads electrically connected to the one or more opto-electronic elements;
a plurality of metal bumps, each metal bump coupled to a respective bonding pad on the surface of the photonics die; and
a barrier formation between the metal bumps and the plurality of v-grooves, wherein a first portion of the barrier formation surrounds the plurality of v-grooves on the photonics die and a second portion of the barrier formation extends from the first portion to form a reservoir area between the first and second portions.

21. The system of claim 20, wherein the barrier formation comprises copper or polyimide.

22. The system of claim 20, wherein the chip package further comprises electronic circuitry to receive the electrical signals generated by the opto-electronic elements.

23. The system of claim 20, further comprising a set of fiber optic cables coupled to the photonics die via the v-grooves.

24. The system of claim 20, wherein the barrier formation further comprises a third portion connected to the first portion, the third portion between the first portion and the metal bumps.

25. The system of claim 24, wherein the third portion is parallel to at least a portion of the first portion.

* * * * *